United States Patent
Menichetti et al.

[19]

[11] Patent Number: 6,000,207
[45] Date of Patent: Dec. 14, 1999

[54] DISASSEMBLABLE HAY RAKE

[75] Inventors: Silvano Menichetti, Umbertide; Sauro Petturitti, Cittá di Castello, both of Italy

[73] Assignee: Sitrex S.r.L., Trestina, Italy

[21] Appl. No.: 09/094,074

[22] Filed: Jun. 9, 1998

[51] Int. Cl.[6] .................................................. A01D 76/00
[52] U.S. Cl. ................................ 56/365; 56/384; 56/380; 56/396
[58] Field of Search ............................... 460/119; 56/384, 56/380, 396, 365, 366

[56] References Cited

U.S. PATENT DOCUMENTS

| | | |
|---|---|---|
| 3,208,536 | 9/1965 | Orendorff . |
| 3,484,803 | 12/1969 | Breed et al. . |
| 3,498,387 | 3/1970 | Roth . |
| 3,814,191 | 6/1974 | Tilbury . |
| 3,834,142 | 9/1974 | Johnston et al. . |
| 3,936,994 | 2/1976 | Mortier et al. . |
| 3,995,416 | 12/1976 | van der Lely . |
| 4,011,914 | 3/1977 | Elmer . |
| 4,034,623 | 7/1977 | Boone et al. . |
| 4,043,099 | 8/1977 | Cheatum . |
| 4,049,062 | 9/1977 | Rossmiller et al. . |
| 4,171,726 | 10/1979 | Ward . |
| 4,172,537 | 10/1979 | Gandrud et al. . |
| 4,183,198 | 1/1980 | Sligter . |
| 4,214,428 | 7/1980 | Caraway . |
| 4,245,458 | 1/1981 | Smith . |
| 4,366,867 | 1/1983 | Filbrun . |
| 4,370,846 | 2/1983 | Arnold . |
| 4,457,127 | 7/1984 | Maier et al. . |
| 4,529,040 | 7/1985 | Grollimund . |
| 4,753,063 | 6/1988 | Buck . |
| 4,920,735 | 5/1990 | Bailey et al. . |
| 4,947,631 | 8/1990 | Kuehn . |
| 4,974,407 | 12/1990 | Rowe et al. . |
| 4,977,734 | 12/1990 | Rowe et al. . |
| 4,996,833 | 3/1991 | Von Allowerden . |
| 5,065,570 | 11/1991 | Kuehn ........................................ 56/384 |
| 5,127,216 | 7/1992 | Kelderman . |
| 5,155,986 | 10/1992 | Kelderman . |
| 5,231,829 | 8/1993 | Tonutti . |
| 5,263,306 | 11/1993 | Tonutti . |
| 5,313,772 | 5/1994 | Tonutti . |
| 5,685,135 | 11/1997 | Menichetti . |
| B1 4,974,407 | 12/1990 | Rowe et al. . |

FOREIGN PATENT DOCUMENTS

| | | |
|---|---|---|
| 24 06 702 | 2/1974 | Germany . |
| 24 55 660 | 7/1975 | Germany . |
| 24 14 098 | 10/1975 | Germany . |
| 28 18 359 | 11/1979 | Germany . |

OTHER PUBLICATIONS

Tonutti, *Carted Hayrakes,* 2 pgs., Italy, No Date.
Photograph of Hodg Bilt Hay Rake, No Date.
Agricultural Machinery Sitrex, *Operator's and Service Parts Manual,* pp. 203–218, No Date.
Hodg–Bilt Hay Rake Carrier, North Little Rock, AR, pp. 178–181, No Date.

*Primary Examiner*—Thomas B. Will
*Assistant Examiner*—Arpad Fabian Kovacs
*Attorney, Agent, or Firm*—Kenyon & Kenyon

[57] ABSTRACT

A towable hay rake is capable of being completely disassembled into parts having relatively homogenous dimensions, thus allowing the hay rake to be easily stored and shipped. In particular the hay rake of the present invention has the advantage that the entire rake can be packed into one rectangular crate of minimum encumbrance. This allows maximum possible practicality and efficiency in shipping and storage of the rake.

28 Claims, 43 Drawing Sheets

DISASSEMBLABLE HAY RAKE

FIELD OF THE INVENTION

The present invention relates to a towable rake for gathering hay, and more particularly to a pull-type hay rake designed for convenient and efficient disassembly and storage or shipment.

BACKGROUND OF THE INVENTION

Towable hay rakes having a "V" shape are known in the art. These rakes are usually referred to as pull-type "V" rakes and are comprised of a main frame and two hinged movable arms which carry a plurality of rotatable rake wheels. An example of such a pull-type "V" rake can be found in U.S. Pat. No. 5,685,135 (assigned to SITREX, s.r.l.), which is incorporated herein by reference in its entirety. Typically these rakes cannot be transported or stored in fully assembled form because of their considerable dimensions. They therefore must be disassembled into smaller sections prior to storage or shipping in order to obtain components of reasonable dimensions, which are then reassembled after shipment or storage. Towable hay rake caddies are also known in the art. Such caddies generally consist of a towable wheeled frame on which hay rake arms carrying rake wheels may be mounted. Typically, caddies are shipped and/or sold separately from the rake arms. An example of such a caddy can be found in U.S. Pat. No. 5,127,216 to Kelderman, which is incorporated herein, in its entirety, by reference.

Because shipping and transportation costs can contribute greatly to the cost of agricultural machinery, such as hay rakes and the like, it is desirable to have a product that stores and ships in a compact and efficient way. Although many of the known hay rakes and caddies may be partially disassembled, they are less than satisfactory in this respect. Furthermore they are not easily disassembled and assembled., The disassembly of the known hay rakes and caddies typically results in the creation of a host of cumbersome and non-homogenous parts whose variety of differing shapes and sizes is not conducive to producing a practical, compact or efficient storage or shipping arrangement. This is in good part because the numerous awkward and non-homogenous shapes of the components cannot be compactly packed together and therefore produce large amounts of non-utilizable empty or "dead" space within the package. Thus, in order to lower shipping costs, manufacturers have in certain cases resorted to packaging two or more hay rakes together so as to intermesh the awkward shapes, in an effort to minimize the amount of empty or "dead air" space in the shipping crate. Since hay rakes or caddies are not usually sold in pairs, it is advantageous to be able to pack them singly into containers having minimized volume and a regular geometric shape that would allow them to be efficiently packed in a shipping vehicle or warehouse. It is especially advantageous to be able to efficiently store and ship an entire hay rake in one package of minimum dimensions. It is also especially advantageous to be able to quickly and conveniently disassemble and reassemble the hay rake.

SUMMARY OF THE INVENTION

These problems are overcome by the present invention, which provides a complete hay rake that is easily disassemblable into a relatively small number of component parts of relatively homogeneous dimensions. The entire rake may therefore be packaged singly into one crate of minimal and geometrically stackable dimensions so as to allow practical and economically efficient storage and shipping.

Surprisingly, the hay rake of the present invention also has the advantage of providing an ample array of geometric adjustability and operational movement. Thus the hay rake of the invention is sturdy and rugged when assembled, but is nonetheless readily disassembled into relatively few component parts that can, if desired, be packed efficiently and compactly into a single crate.

In another aspect of the invention there is provided a hay rake caddy which is disassemblable into pieces of relatively few and homogenous dimensions which can be conveniently and efficiently disassembled and packaged for shipping and storage.

In another aspect of the present invention, there is provided a method of disassembling the hay rake or caddy of the present invention into relatively few components of relatively homogeneous dimensions.

In still another aspect of the present invention there is provided a method of assembling the hay rake or caddy of the present invention from component parts of relatively homogeneous dimension that may be disassembled for packaging and shipping.

In still another aspect of the present invention there is provided a method of efficiently packaging a single hay rake of the present invention in a crate of practical dimensions suitable for economical shipping and storage.

In yet another aspect of the present invention there is provided a crate of minimal and geometrically stackable dimensions suitable for economical shipping and storage of the hay rake of the present invention.

BRIEF DESCRIPTION OF THE DRAWINGS

The invention will now be described in reference to several preferred embodiments, which are illustrated in the accompanying drawings, a brief description of which follows.

DETAILED DESCRIPTION OF THE INVENTION

Figure 1:
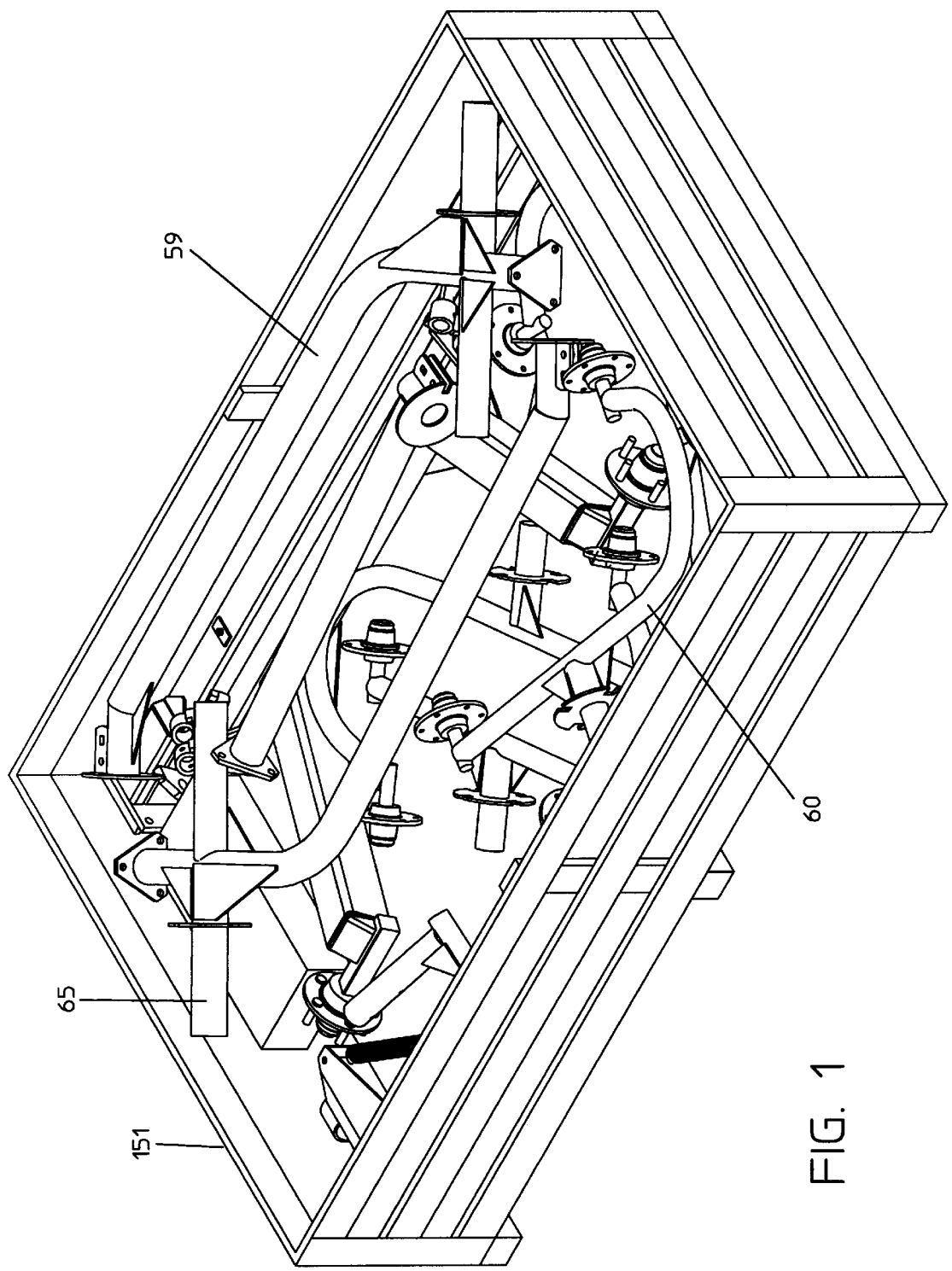
FIG. 1 is a perspective view of one arrangement of all the component parts of one embodiment of the hay rake of the present invention in a single rectangular crate.

The hay rake according to the present invention is shown in various embodiments, both as a complete rake or a caddy, in packaged, assembled or partially assembled configurations in FIGS. 1–43.

With reference to the drawings, wherein like reference numerals designate identical or corresponding parts throughout the several views, the principal components of the main frame 200 of the hay rake of the present invention are a tow bar 1; a hitch member 38 attached to the front end of the tow bar; a central frame element 160 transversely attached to the back end of the tow bar, and comprising a central cross member 11 and right and left rear appendices 7, 8 on which wheels may be mounted; right and left lateral elements 162, 161 pivotally attached to the right and left ends of the central cross member; means for raising and lowering the right and left lateral elements such as right and left hydraulic cylinders 4, 5; and right and left mounting studs 164, 163 for mounting the rake arms on the right and left lateral elements 162, 161, respectively.

The principal components of the rake arms are right and left connecting elements 165, 166 mountable on the right and left mounting studs 164, 163, respectively; one or more rake arm sections, e.g. 65, 63, 59, 58, 123, 122, for connecting the right and left connecting elements 165, 166 to one or more rake wheel mounts, e.g. 60–62 and 64–67, on which rake wheels 68, 69 may be mounted. Preferably, the length of the rake arm sections and rake arm mounts does not exceed the length of the tow bar 1, and more preferably is approximately the same as or less than the diameter of the rake wheels 68, 69.

Figure 5:
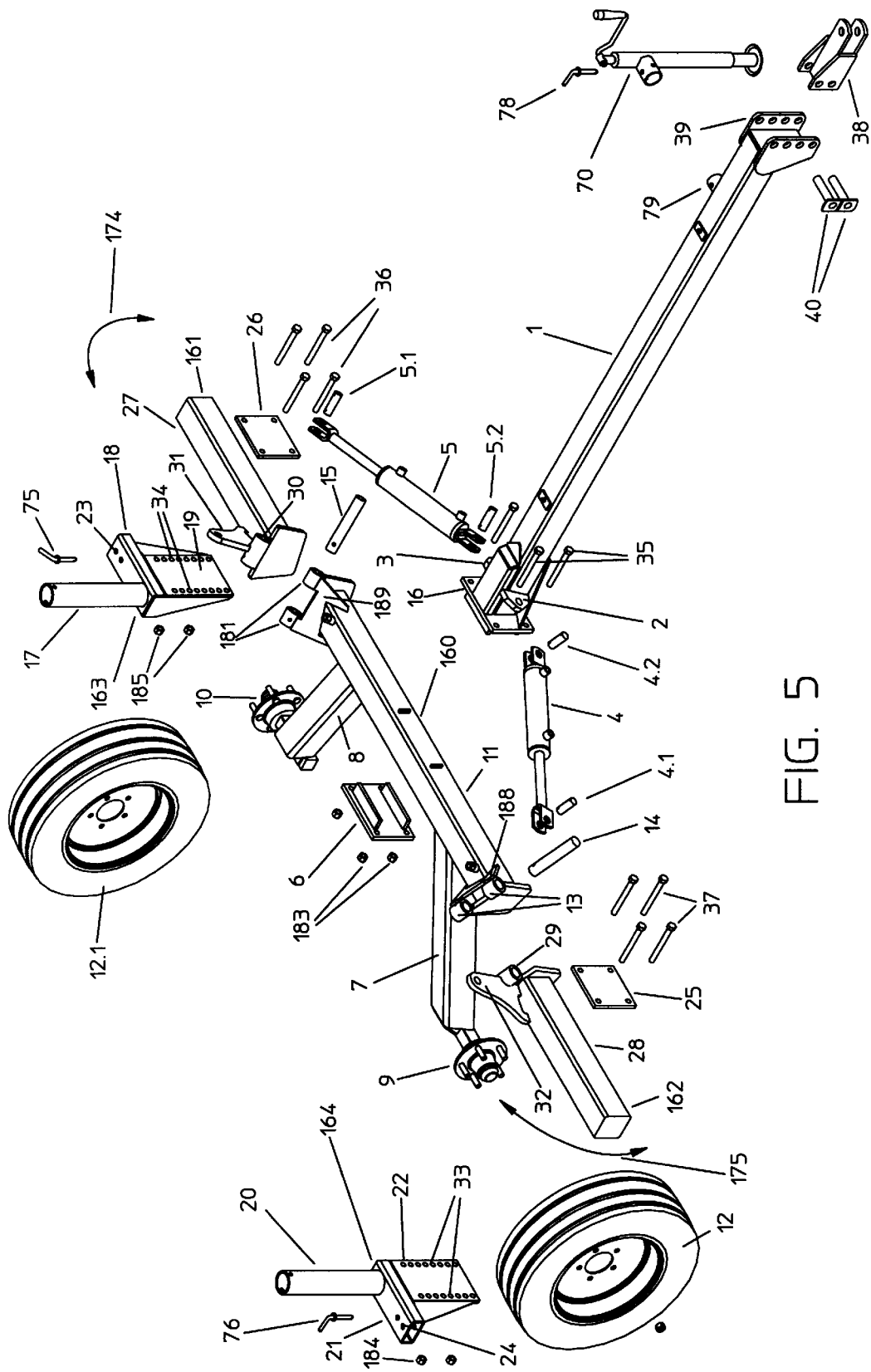
FIG. 5 is an exploded view of one embodiment of the main frame section of the hay rake of the present invention in disassembled form.

We will now proceed to describe the rake more specifically with reference to FIGS. 5–11 which show various views of one embodiment of the hay rake of the present invention. With reference to FIG. 5, which is an exploded view of the main frame 200 of that embodiment, the main frame 200 includes an elongated tow bar 1, which has at its front end a bracket 39 to which a hitch member 38 may be attached via pins 40. Preferably, the hitch member 38 may be adjusted heightwise by selectively aligning it with the desired holes in the bracket 39. Alternatively, the hitch member 38 may be fixed via weld or other means to bracket 39 or directly to the tow bar 1.

Preferably, when the hay rake is not in use, it is held by a parking stand 70. Thus, near the front end of the tow bar 1 is a receptacle 79 adapted to receive the parking stand 70. The parking stand 70 has a portion which is adapted to be received in receptacle 79 and is preferably provided with holes parallel and perpendicular to the length of the parking stand 70. When the hay rake is parked, the parking stand 70 may be fixed in place, for example, by inserting pin 78 in the holes parallel to the length of the parking stand 70; when the parking stand 70 is in the idle state, it may be stored on the tow bar by inserting pin 78 in the holes perpendicular to the parking stand 70. A clip 224 may be used to fix the pin 78 in place.

Figure 27:
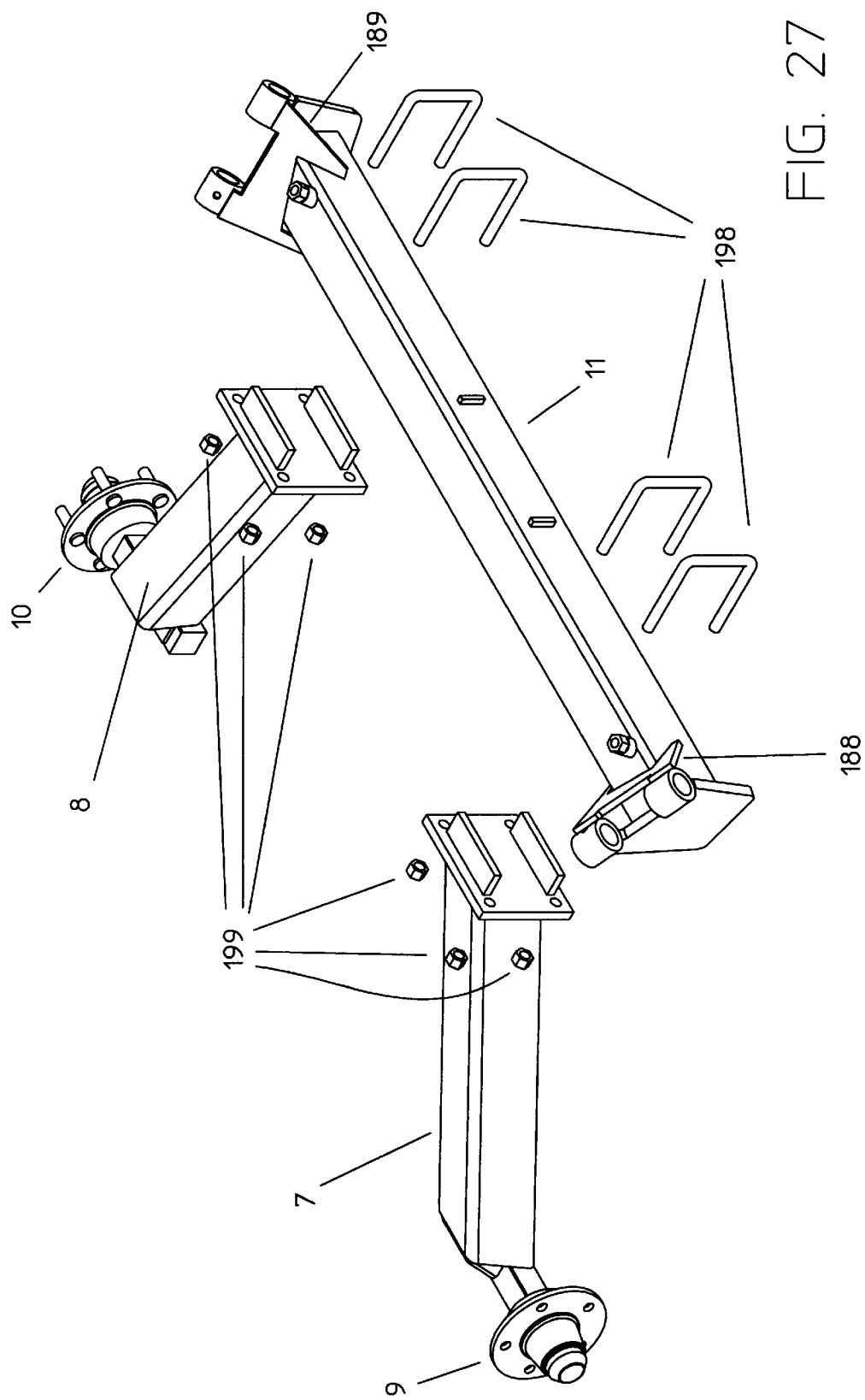
FIG. 27 is an exploded view showing the disassembled appendices and central cross member sections of the hay rake according to one embodiment of the present invention.
Figure 28:
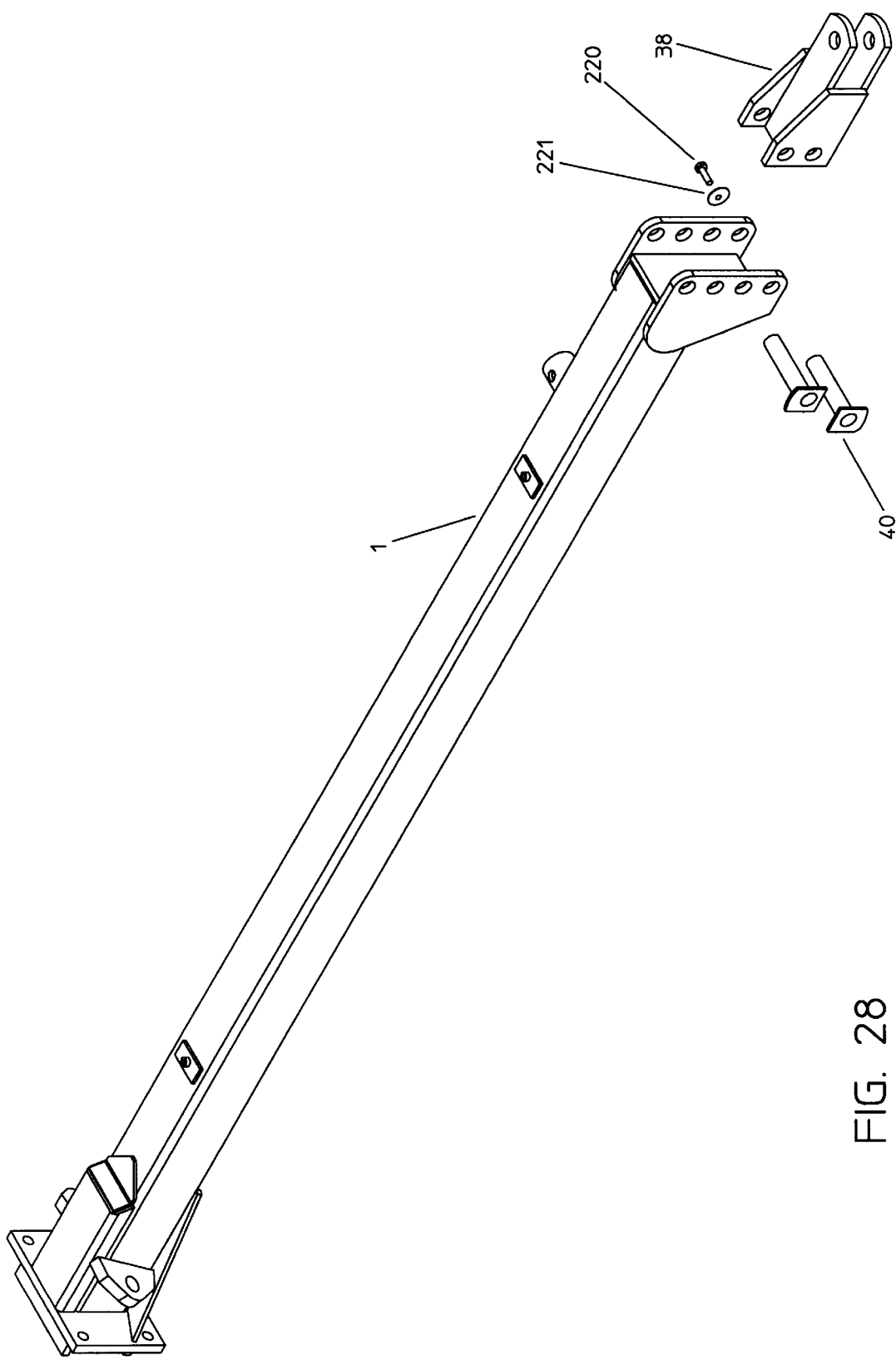
FIGS. 28–33 and 35 are perspective views showing the main frame portion of the hay rake of FIGS. 5–11 as it is being assembled/disassembled.
Figure 29:
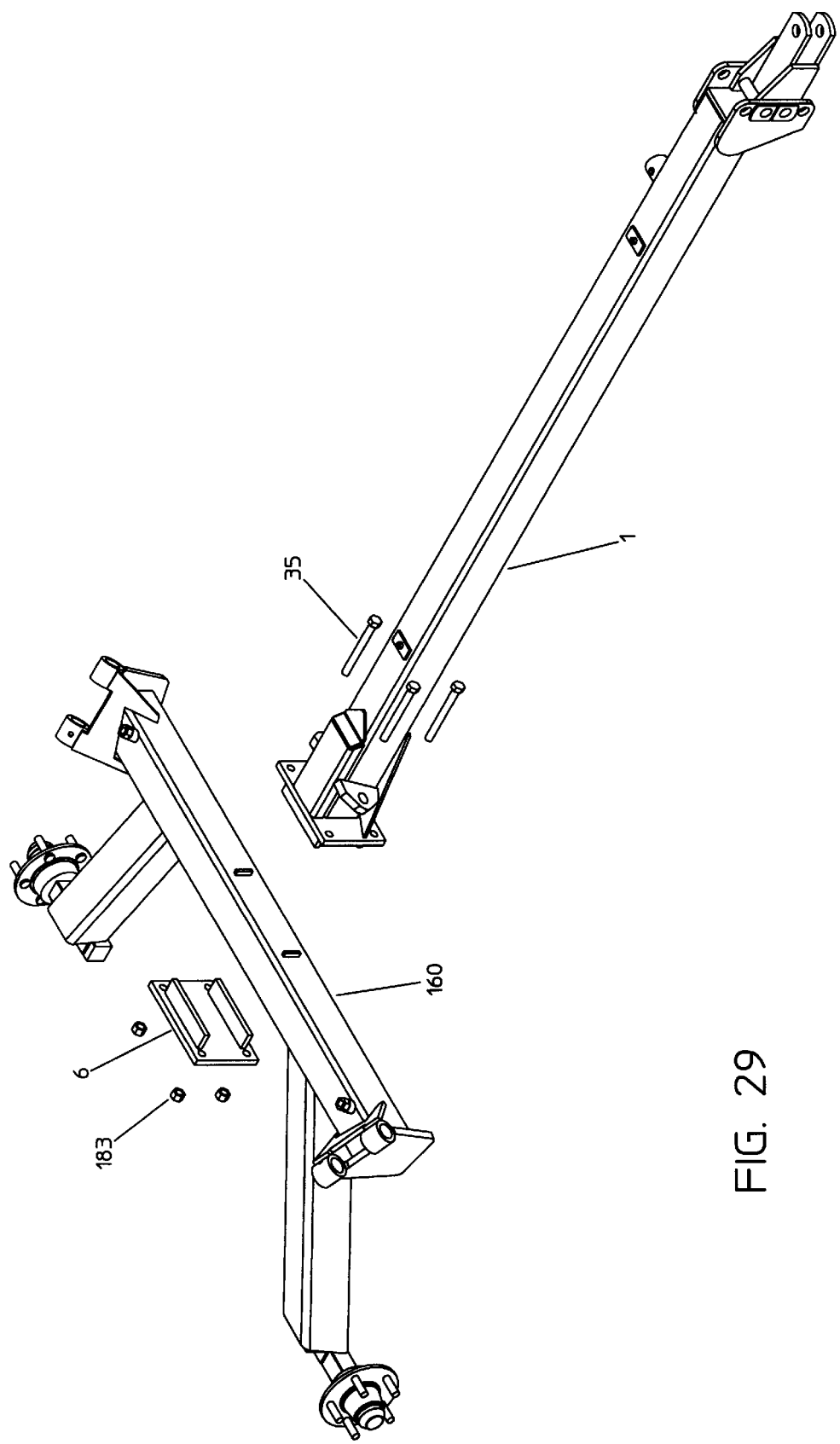
Figure 30:
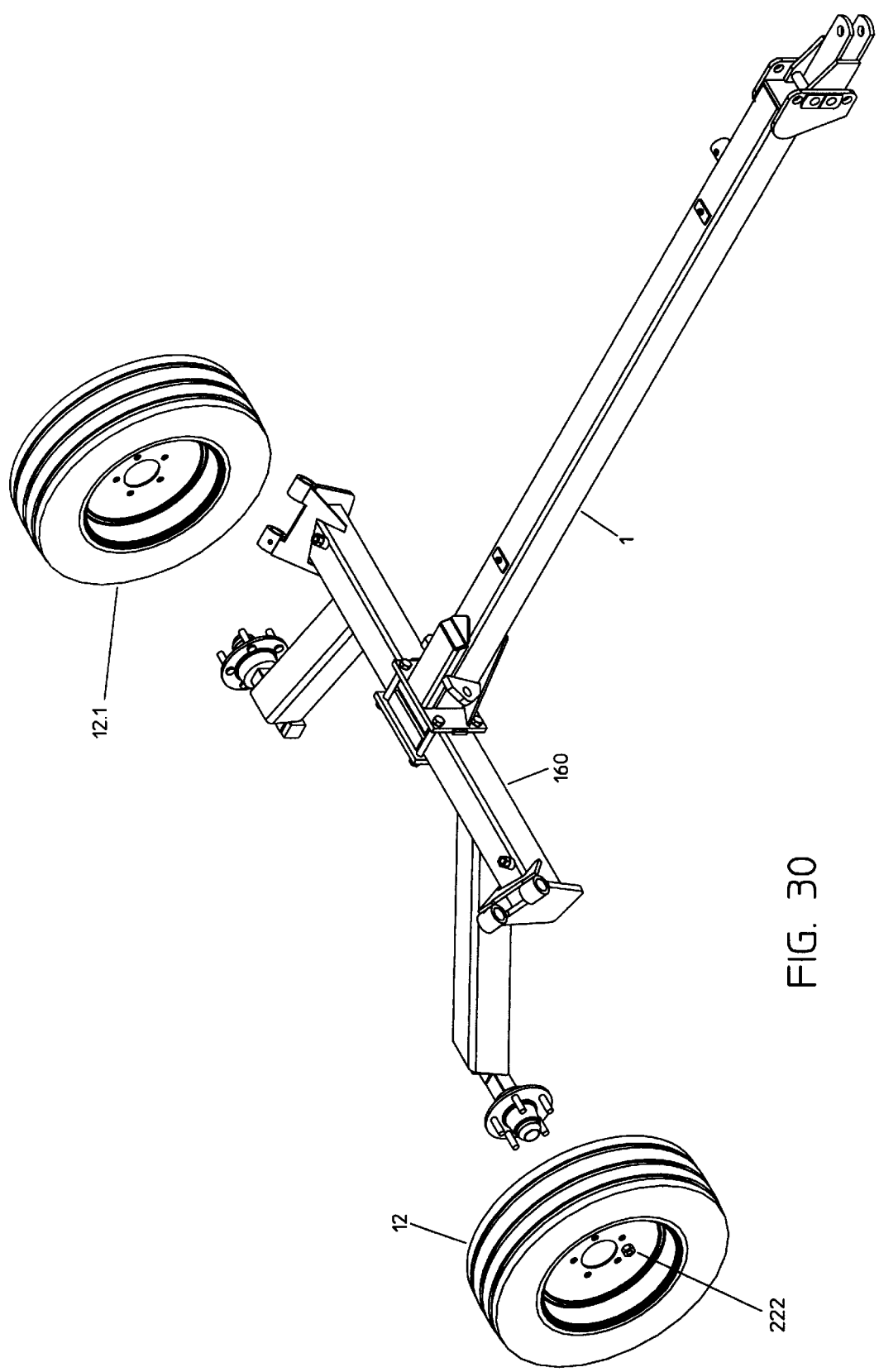
Figure 31:
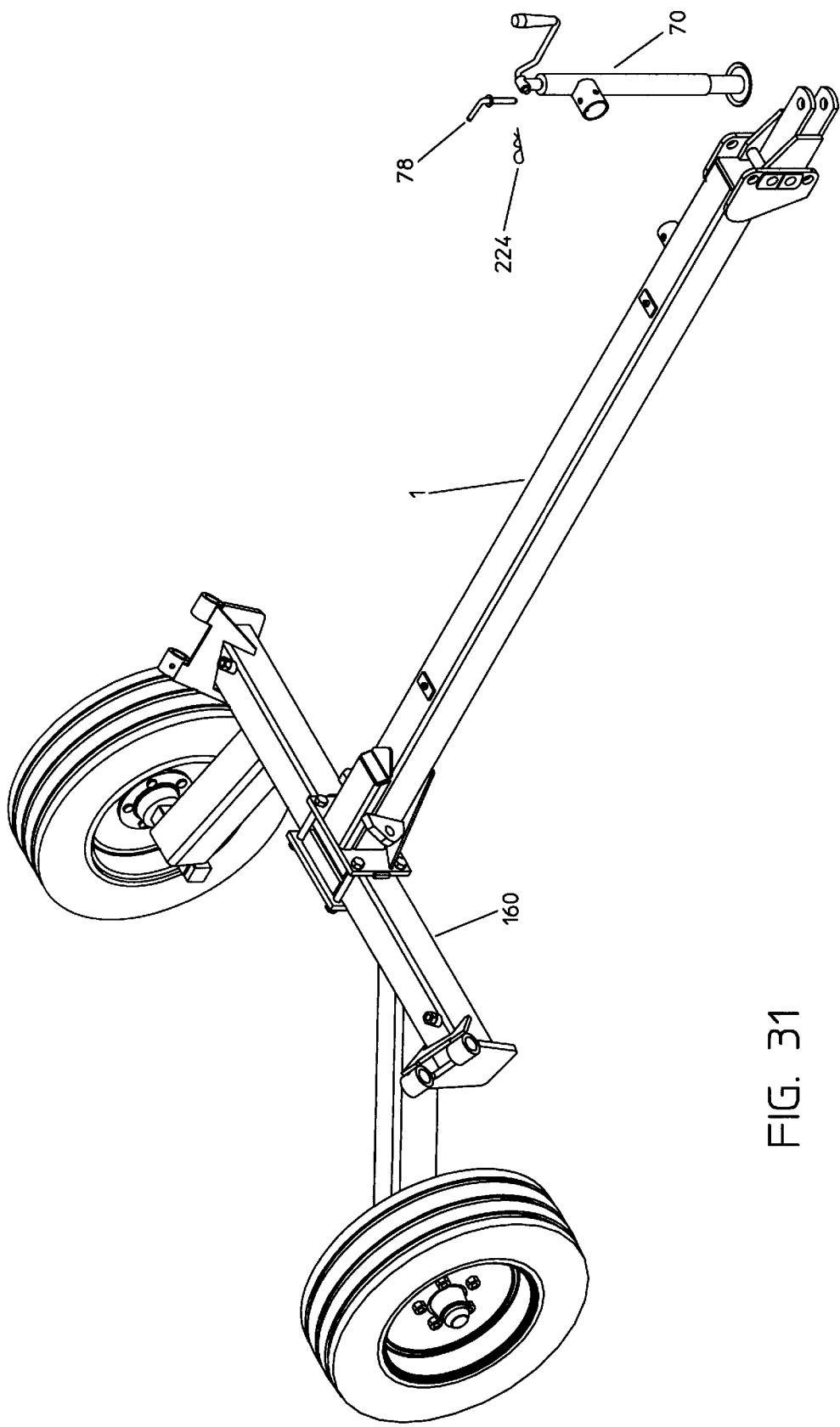
Figure 32:
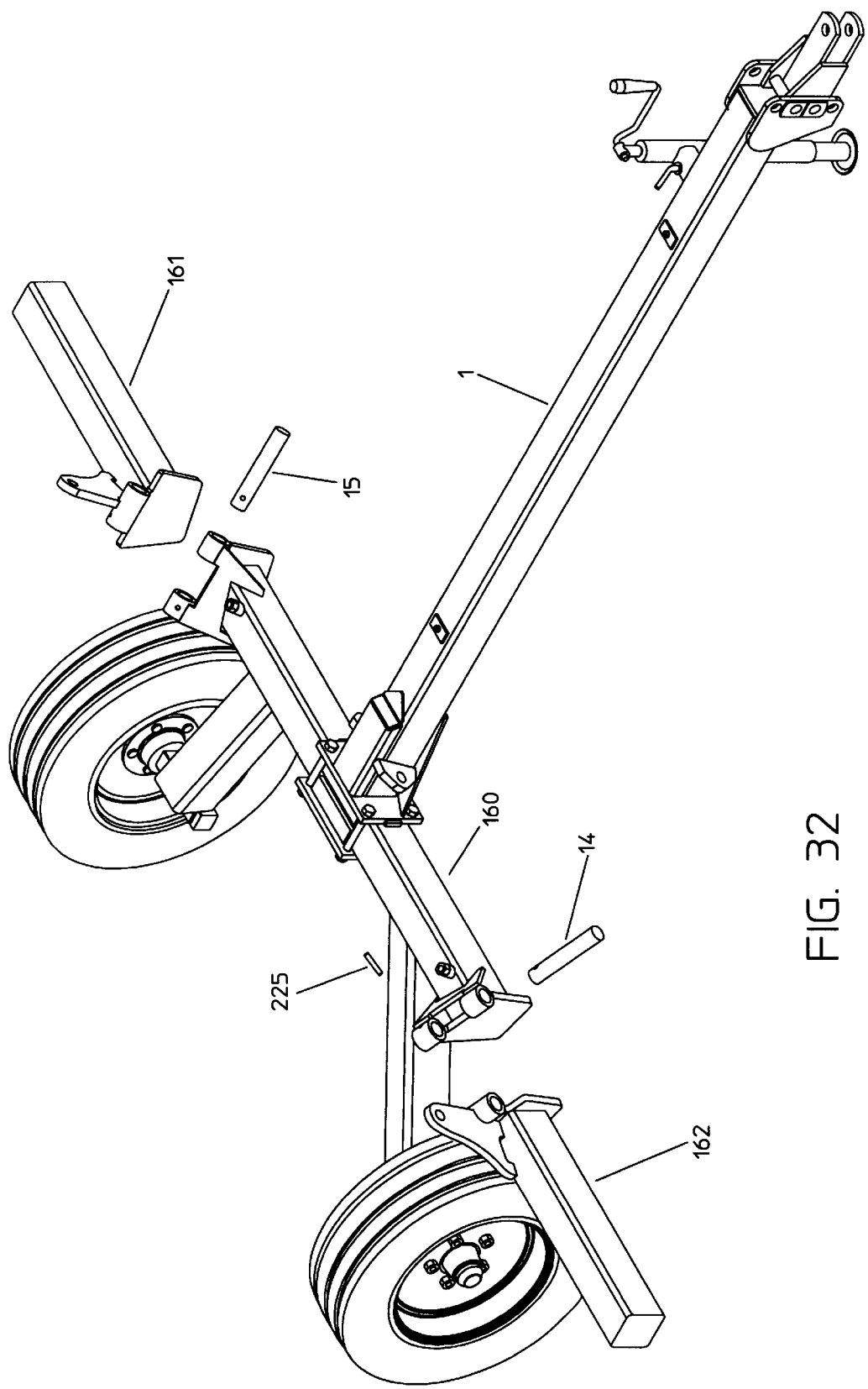
Figure 33:
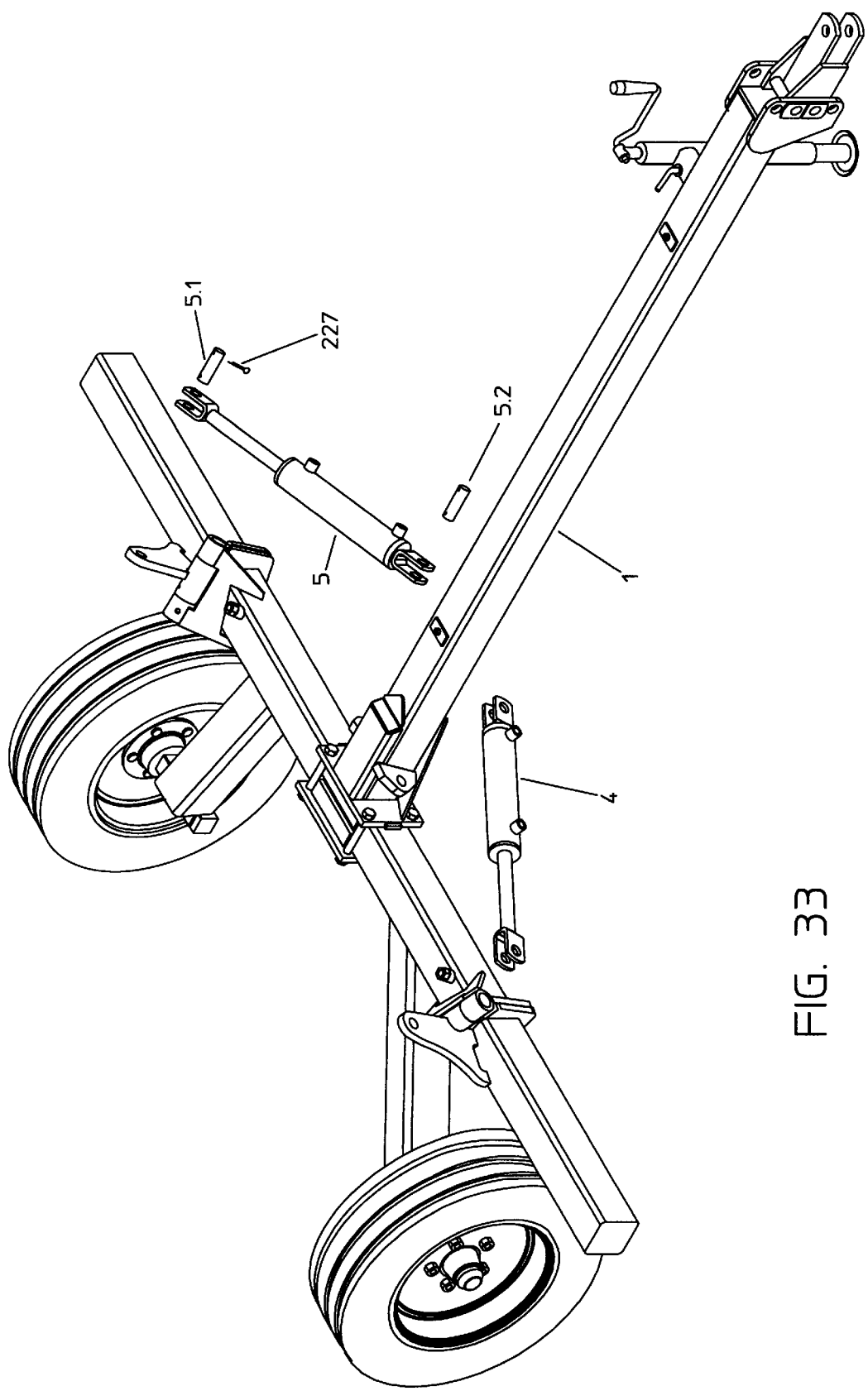
Figure 34:
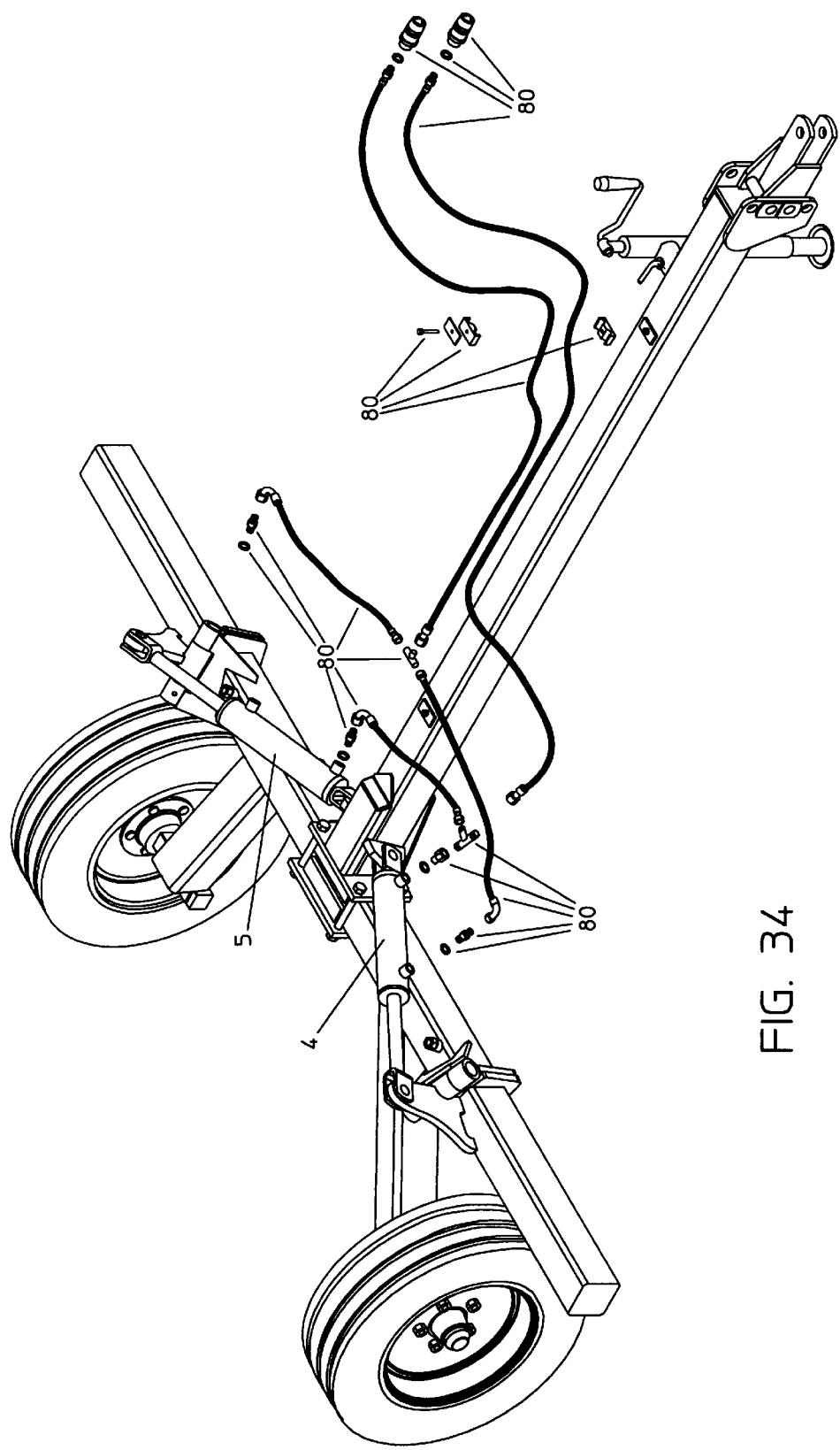
FIG. 34 is a perspective view showing the assembly of components of the hydraulic system of FIG. 19.
Figure 35:
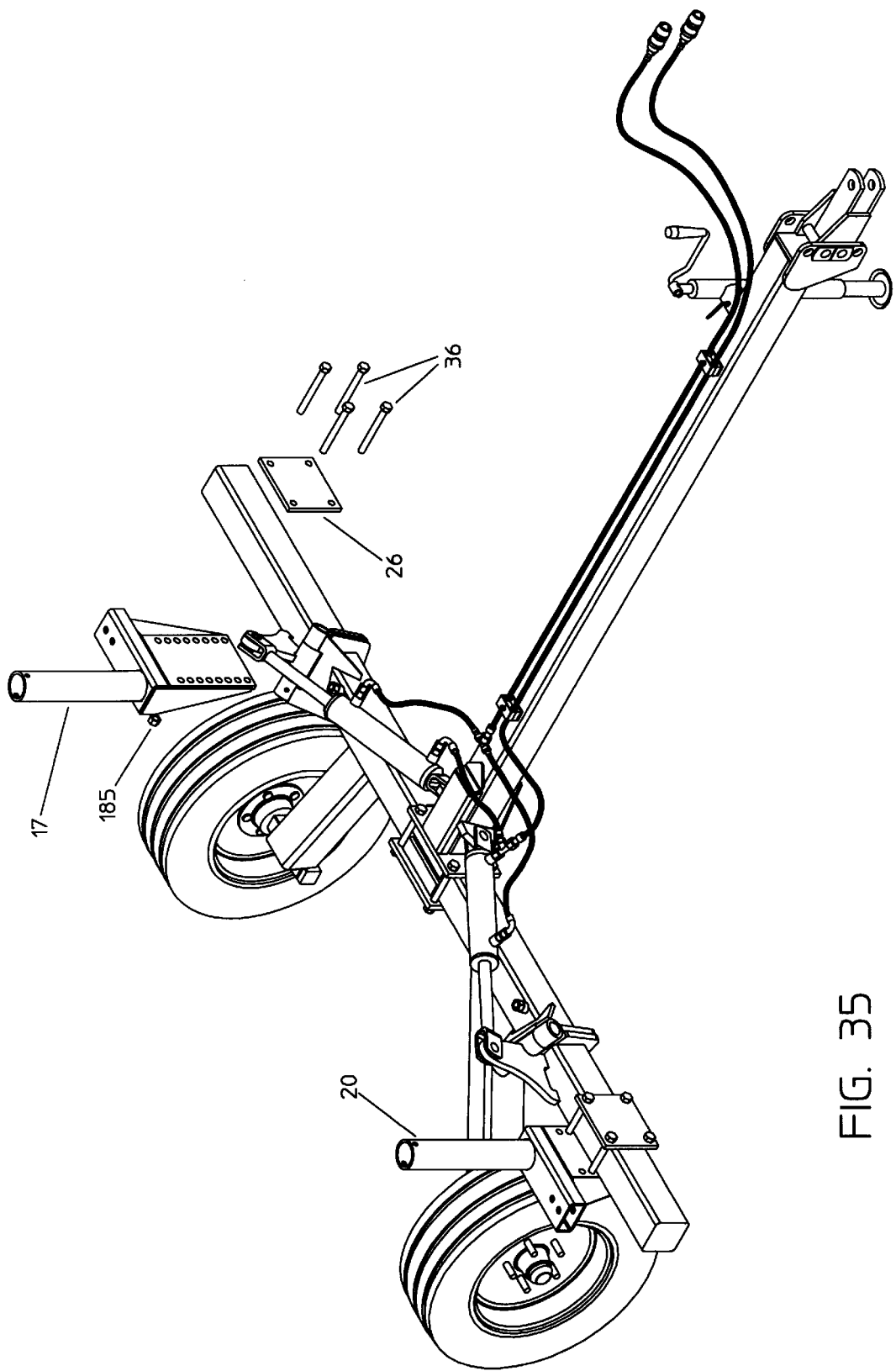
Figure 36:
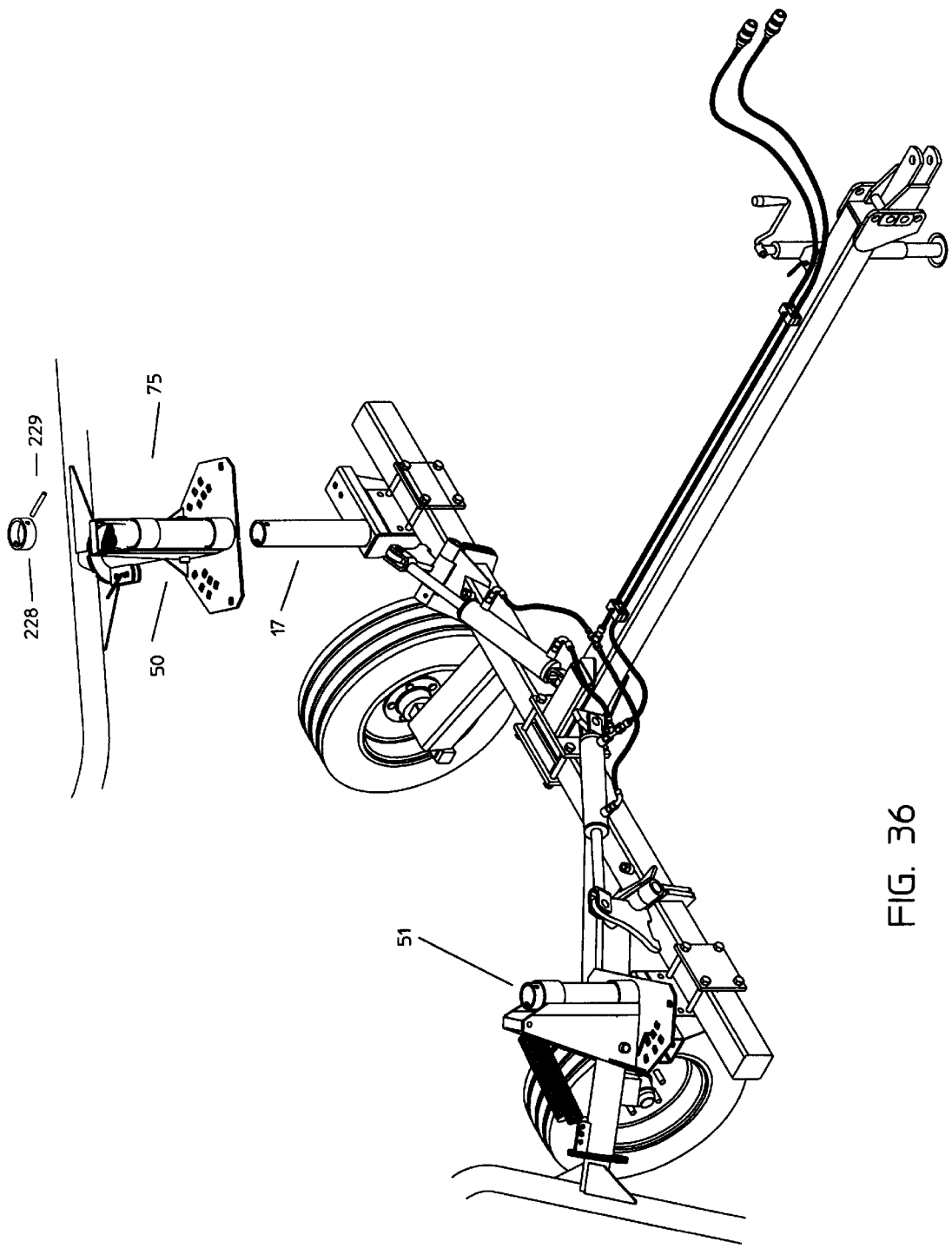
FIG. 36 is a perspective view showing an assembled rake arm as it is being mounted on the main frame portion of the hay rake of FIGS. 5–11.
Figure 37:
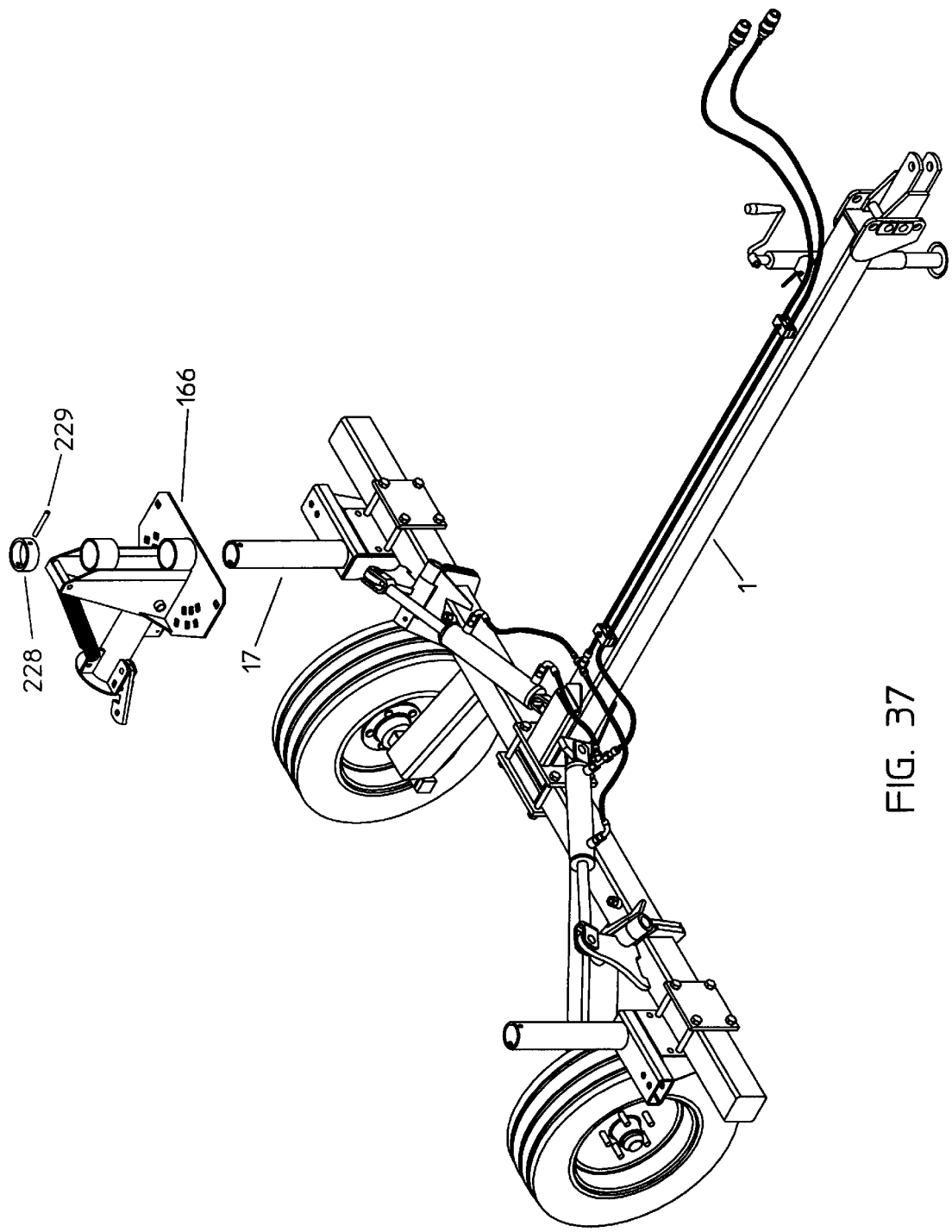
FIGS. 37–41 are perspective views showing one rake arm portion of the hay rake of FIGS. 5–11 as it is being assembled/disassembled.
Figure 38:
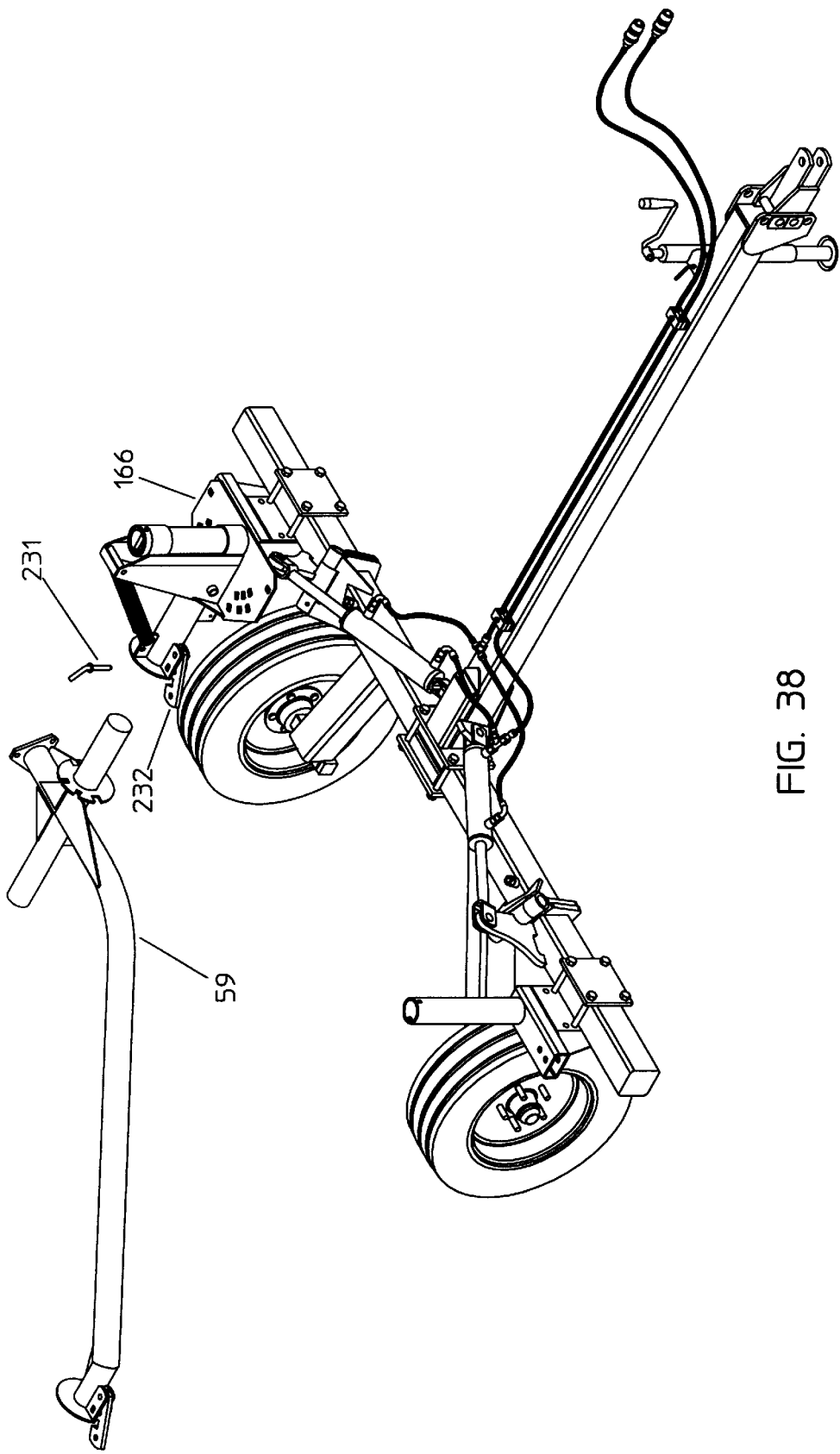
Figure 39:
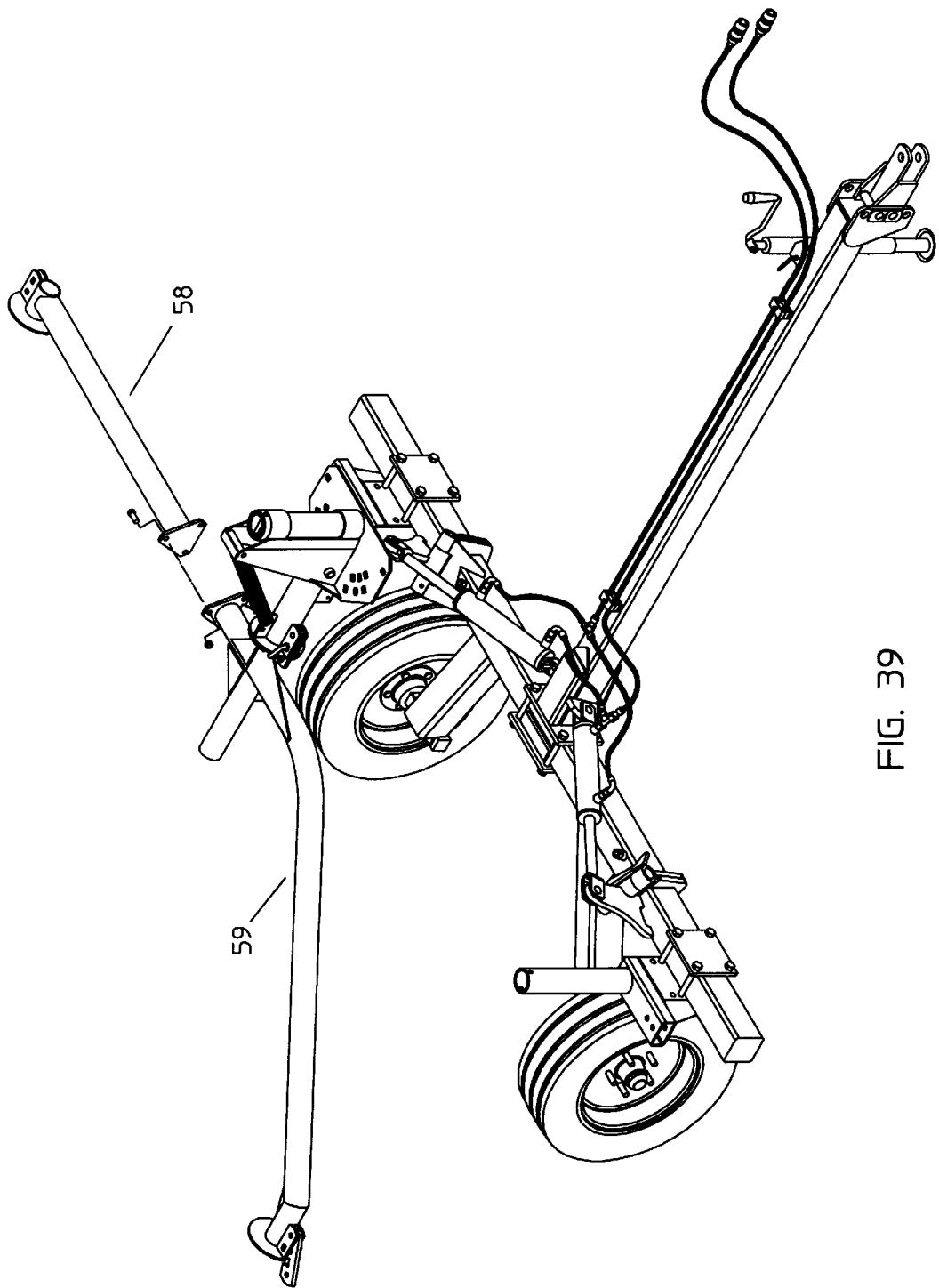
Figure 40:
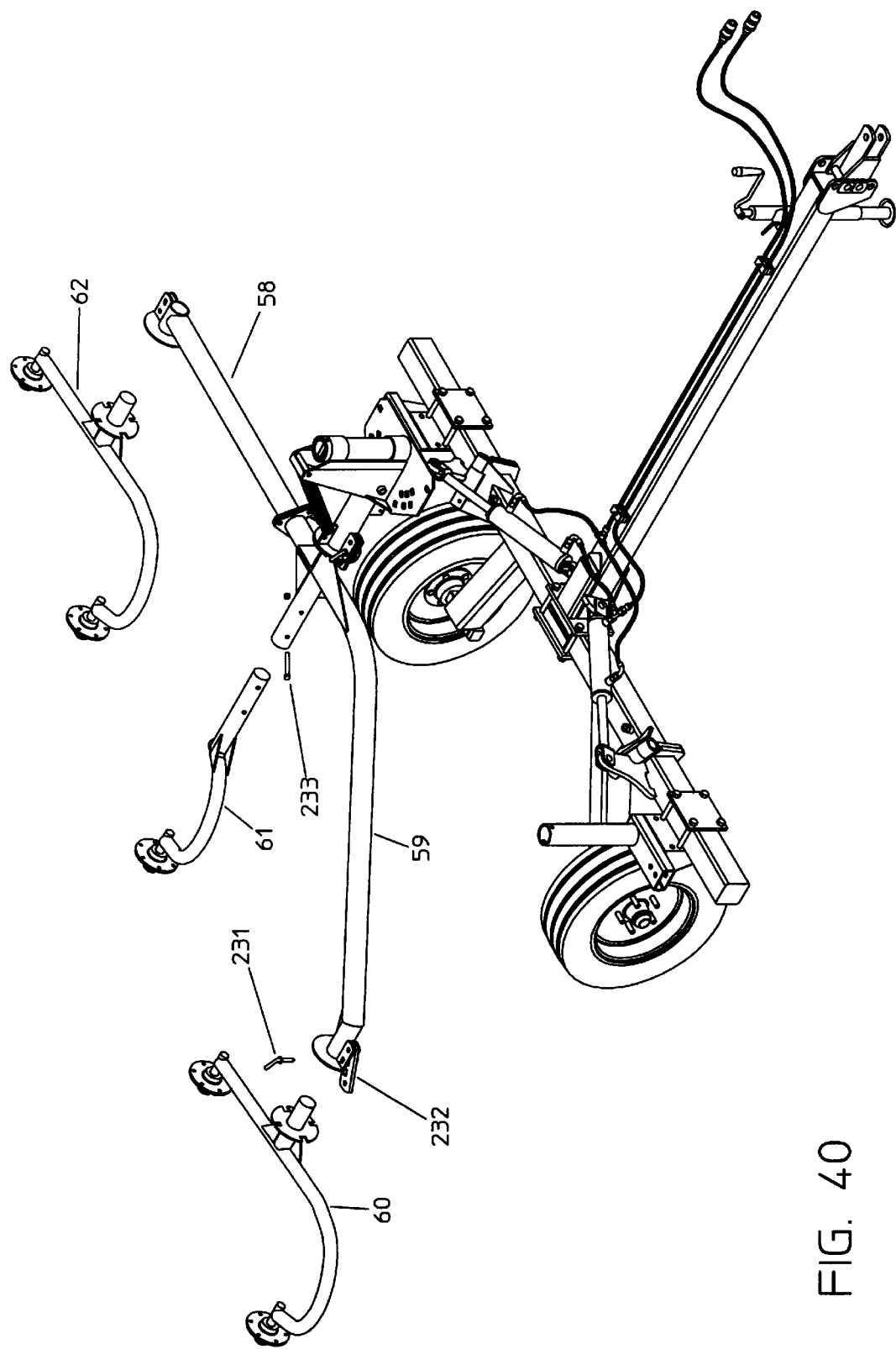
Figure 41:
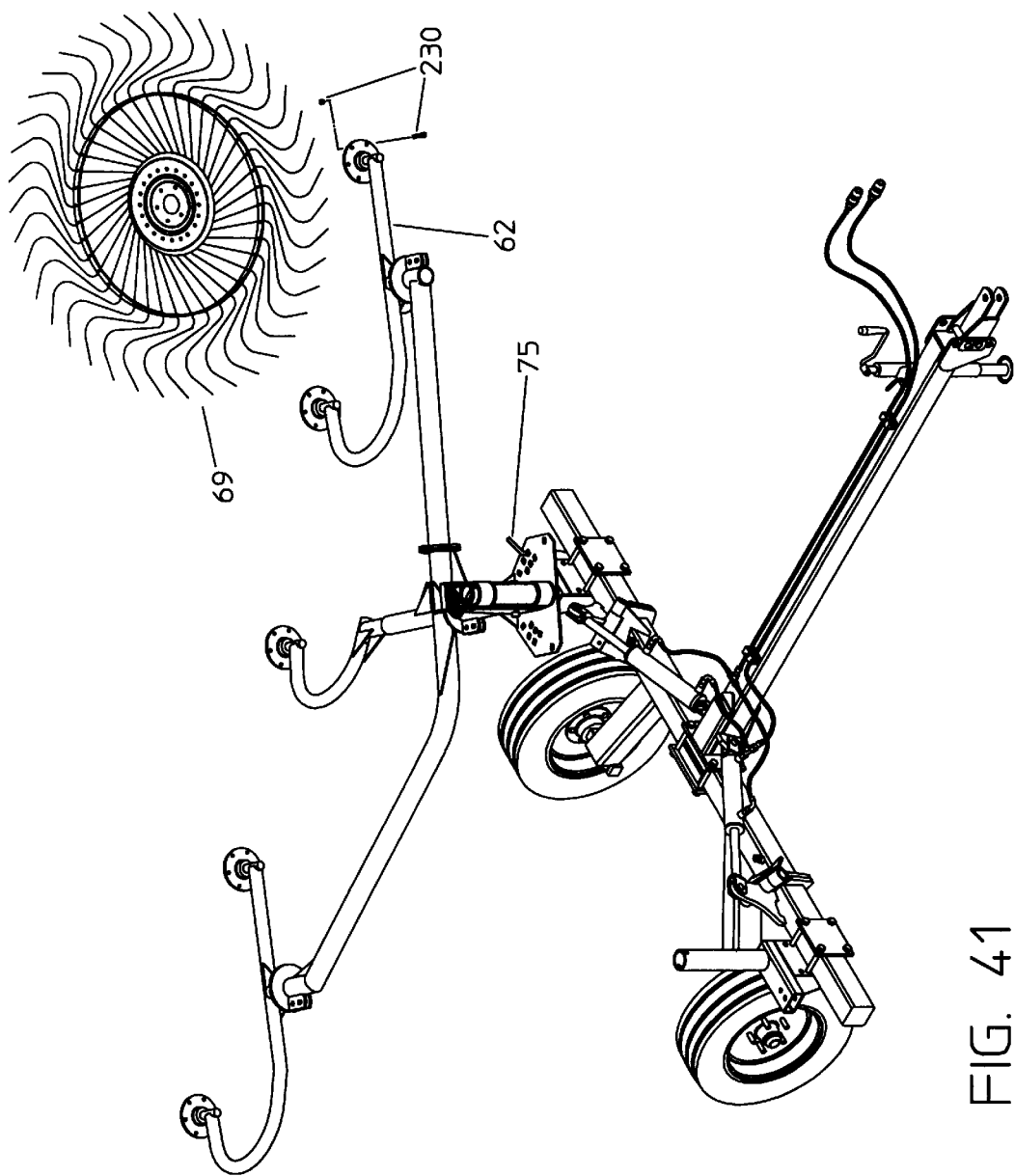

Tow bar 1 is transversely attached to central frame element 160, which includes a central cross member 11 and right and left rear appendices 7, 8. The right and left rear appendices 7, 8 are fixed at their first end to the central cross member 11, and have, attached at their other end, hub assemblies 9, 10, respectively, which provide rotatable mounts for wheels 12, 12.1, respectively. The right and left rear appendices 7, 8 may be welded at their first ends to the central cross member 11, or, optionally, may be detachably fixed to it via plates 197, U-bolts 198, and nuts 199, as shown in FIG. 27. The plates 197 may be permanently welded to the appendices 7, 8, thus, allowing them to be easily disassembled from the central cross member 11 by removing nuts 199 from U-bolts 198.

A plate 16, fixed to the back end of the tow bar 1, works in cooperation with a plate 6 to secure the tow bar 1 to the central cross member 11 of the central frame element 160. Plate 16 and plate 6 may be placed on opposing sides of the central frame element 160 and clamped thereto by nuts 183 and bolts 35.

Preferably, the longitudinal angle of the central frame element 160 may be adjusted relative to the ground by varying the angle of the tow bar 1 relative to the ground. This may be effected by adjusting the position of the hitch member 38 within the plurality of holes in the mounting plate 39.

Central cross member 11 includes hinge members 188, 189, which are fixed to its right and left ends. Hinge members 188, 189, include receptacles 13, 181, respectively, which are adapted to receive pins 14, 15, respectively.

Right and left lateral elements 162, 161, which include extension bars 28, 27, hinge elements 29, 30 and attachments 32, 31, to which hydraulic cylinders 4, 5 or other means for raising or lowering them may be attached, are adapted to pivotally attach to the left and right ends of the central cross member 11 via hinge members 188, 189. Hinge elements 30 and 29, are fixed to the ends of the extension bars 27, 28 respectively, and compliment the hinge members 13, 181 of the central cross member 11. Thus, the lateral elements 161, 162 may be pivotally joined to the central cross member 11 by inserting the pins 14 and 15 into the complimentary hinge members 13 and 29, and 181 and 30, respectively.

Hydraulic cylinders 4, 5 may be attached to right and left lateral elements 162, 161 by attachments 32, 31, respectively. Hydraulic cylinder 4 is secured at its first end via pin 4.1 to attachment 32 and at its second end via pin 4.2 to a bracket 2 fixed to the tow bar 1. Similarly, hydraulic cylinder 5 may be secured to attachment 31 via pin 5.1 and to a bracket 3 fixed to the tow bar 1 via pin 5.2. Hydraulic cylinders 4, 5 may thus be extended and retracted in order to rotate the lateral elements 161, 162 about the axis defined by pin 15 and hinge members 181, 30, and pin 14 and hinge members 13 and 29, respectively. Preferably the axis of rotation is neither vertical nor horizontal but extends upwardly and inwardly towards the centerline of the rake as it is followed from front to rear. The lateral elements 161, 162 may thus be raised and lowered, taking with them all the components joined thereto, such as the rake arm assemblies 167, 168 and the rake wheels 68, 69. This movement is utilized to lower the rake arms for the raking operation and to raise them for the transport operation.

One of skill in the art will appreciate that brackets 2, 3 may be placed at different locations on the tow bar 1, on the central cross member 11, or even on the rear appendices 7, 8. For example, brackets 2, 3 may be positioned to correlate with the desired rotation axis of the hinge members 13, 181.

Main frame 200 also includes right and left mounting studs 164, 163 for mounting the rake arms. Mounting studs 164, 163 are attached to the right and left lateral elements 162, 161, respectively. Each mounting stud 163, 164, includes a base plate 18, 21; an elongated cylindrical pin 17, 20, which is preferably substantially perpendicular to the base plate 18, 21; and an assembly plate 19, 22 having a plurality of holes 34, 33. The mounting studs 163, 164 are detachably secured to the lateral elements 161, 162 via plates 26, 25, bolts 36, 37, and nuts 185, 184. They may be positioned at various locations so to vary the width between them. The height of the mounting studs 163, 164 relative to the lateral extensions 161, 162 may be selectively adjusted by aligning the plurality of holes 33, 34 with the holes of plates 26, 25.

Figure 6:
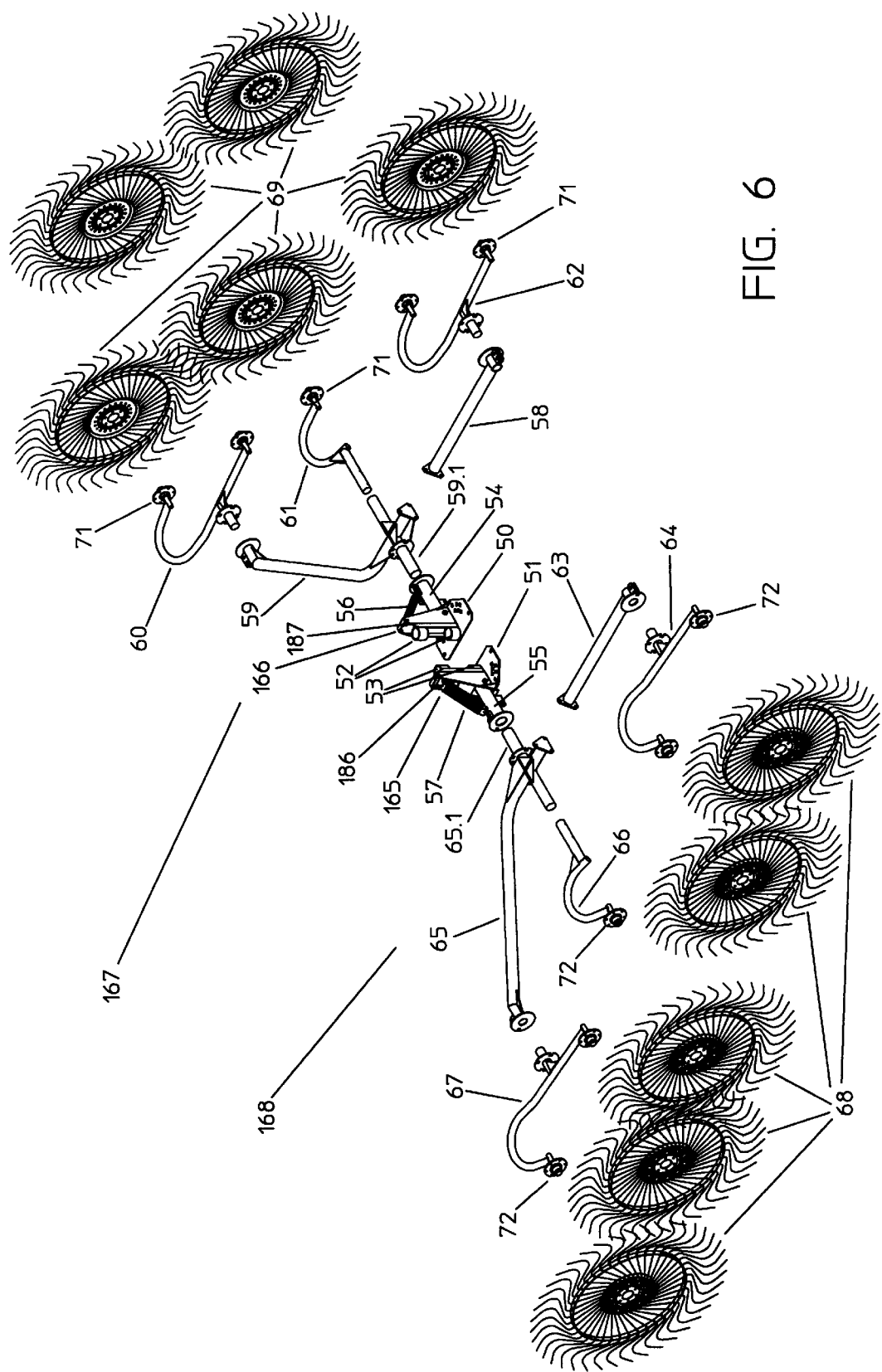
FIG. 6 is an exploded view of one embodiment of the rake arm assemblies of the hay rake of the present invention in disassembled form.

An exploded view of the left and right rake arm assemblies 167, 168 (see FIG. 7) is seen in FIG. 6. The connecting elements 166, 165, respectively, include base plates 50, 51, rake arm heads 55, 54 (adapted to receive the rake arm sections 65, 59, traction springs 56, 57, and pin mounts 52, 53. The pin mounts 52, 53 are adapted to receive the elongated pins 17, 20 of the mounting studs 163, 164 to thereby mount the rake arm assemblies 167, 168 onto the main frame 200. The rake arm heads 54, 55 are pivotally connected to the connecting elements 165, 166 by, for example, a pin joint, so that the rake arm heads 54, 55 may pivot in the vertical plane. The vertical movements are partially balanced and absorbed by the traction springs 56, 57, which connect between the rake arm heads 54, 55 and the top portions 186, 187 of the connecting elements 165, 166. Thus, when the rake arm assemblies 167, 168 are mounted on the main frame 200, and the hay rake is in the operative state, the rake wheels 68, 69 may adjust to small irregularities in the ground due to the action of the rake arm heads 54, 55 and the traction springs 56, 57.

The left and right rake arm assemblies 167, 168 also include respectively a first rake arm section 59, 65, a second rake arm section 58, 63, a first rake wheel mount 60, 67, a second rake wheel mount 61, 66, and a third rake wheel mount 62, 64. One of the rake arm sections of each rake arm 65, 59 includes a pin/flange unit 65.1, 59.1 adapted to be received in rake arm heads 55, 54. The first and third rake wheel mounts 60, 67, and 62, 64 have an elongated curved shape in which rotatable hubs 71, 72 are mounted on each end. The second rake wheel mount 61, 66, on the other hand, is adapted with a single rotatable hub 71, 72. Rake wheels 69, 68 may be rotatably mounted on the rotatable hubs 71, 72. It will be appreciated by those of skill in the art that the geometry of the rake arm assemblies 167, 168 may vary. For example, the number, shape and length of the rake arm sections 58, 59, 63, 65 and the rake wheel mounts 60, 61, 62, 64, 66, 67 may be varied to provide a desired spacial relationship between the various rake wheels 68, 69. Preferably, however, the length of the rake arm sections and rake arm mounts does not exceed the length of the tow bar 1, and more preferably is approximately the same as or less than the diameter of the rake wheels 68, 69.

Figure 7:
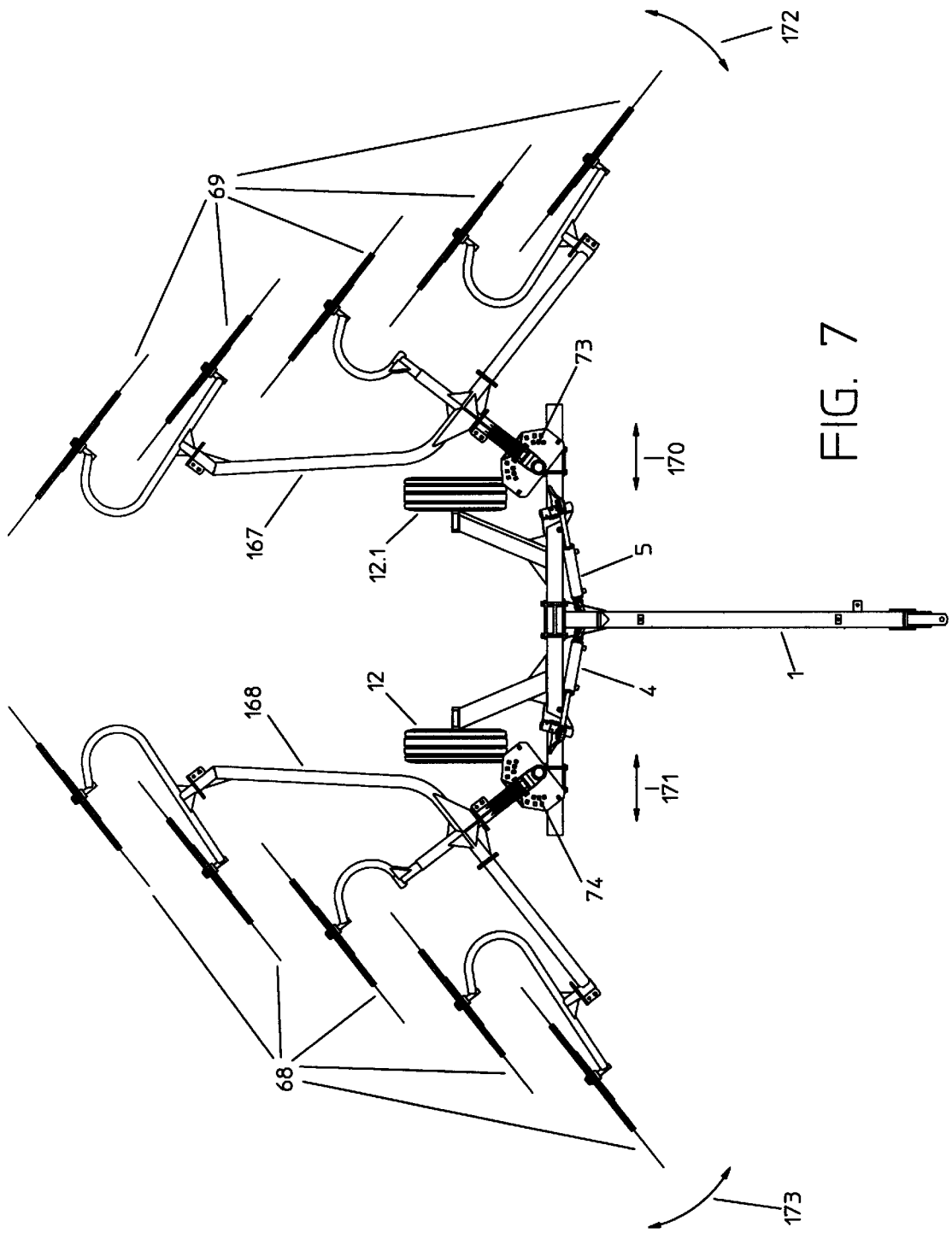
FIG. 7 is a top view of a fully assembled embodiment of the hay rake of the present invention wherein the arms are in the lowered (or operating) position.

The rake arm assemblies 167, 168 may be mounted on the main frame 200 by placing the elongated pins 17, 20 of the mounting studs 163, 164 through the pin mounts 52, 53 of the connecting elements 165, 166. FIG. 7 shows a top view of the hay rake with the rake arm assemblies 167, 168 mounted on the main frame 200. With reference to FIG. 7, the relative width between the mounting studs 163 and 164 (and hence, the relative distance between the rake arm assemblies 167, 168) may be adjusted in the directions indicated by arrows 170, 171. For example, the mounting stud 164 may be fixed via plates 25, bolts 37, and nuts 184 to the extension bar 28 at continuously selectable positions as indicated by arrow 171.

In addition to the relative positional adjustability indicated by arrows 170, 171, the rake arm assemblies 167, 168, may be rotationally adjusted about the mounting studs 163, 164 via the connecting elements 165, 166. Holes 24 on the base plate 21 (as shown in FIG. 5) may be aligned with any of the plurality of holes 74 on the base plate 51 of connecting element 165. Similarly, holes 23 on the base plate 18 may be aligned with any of the plurality of holes 73 on the base plate 50 of connecting element 166. Pins 75 and 76 may be inserted into the aligned holes 23, 73, and 24, 74, respectively, to fix the relative angular position of the connecting elements 165, 166 on the mounting studs 164, 163. Thus, the orientation of the rake arm assemblies 167, 168 as indicated by direction arrows 172, 173 may be adjusted. That is, the rake arm assemblies may be rotated in the horizontal plane, for example, about the mounting studs to thus affect the orientation of the rake arm assemblies.

Figure 8:
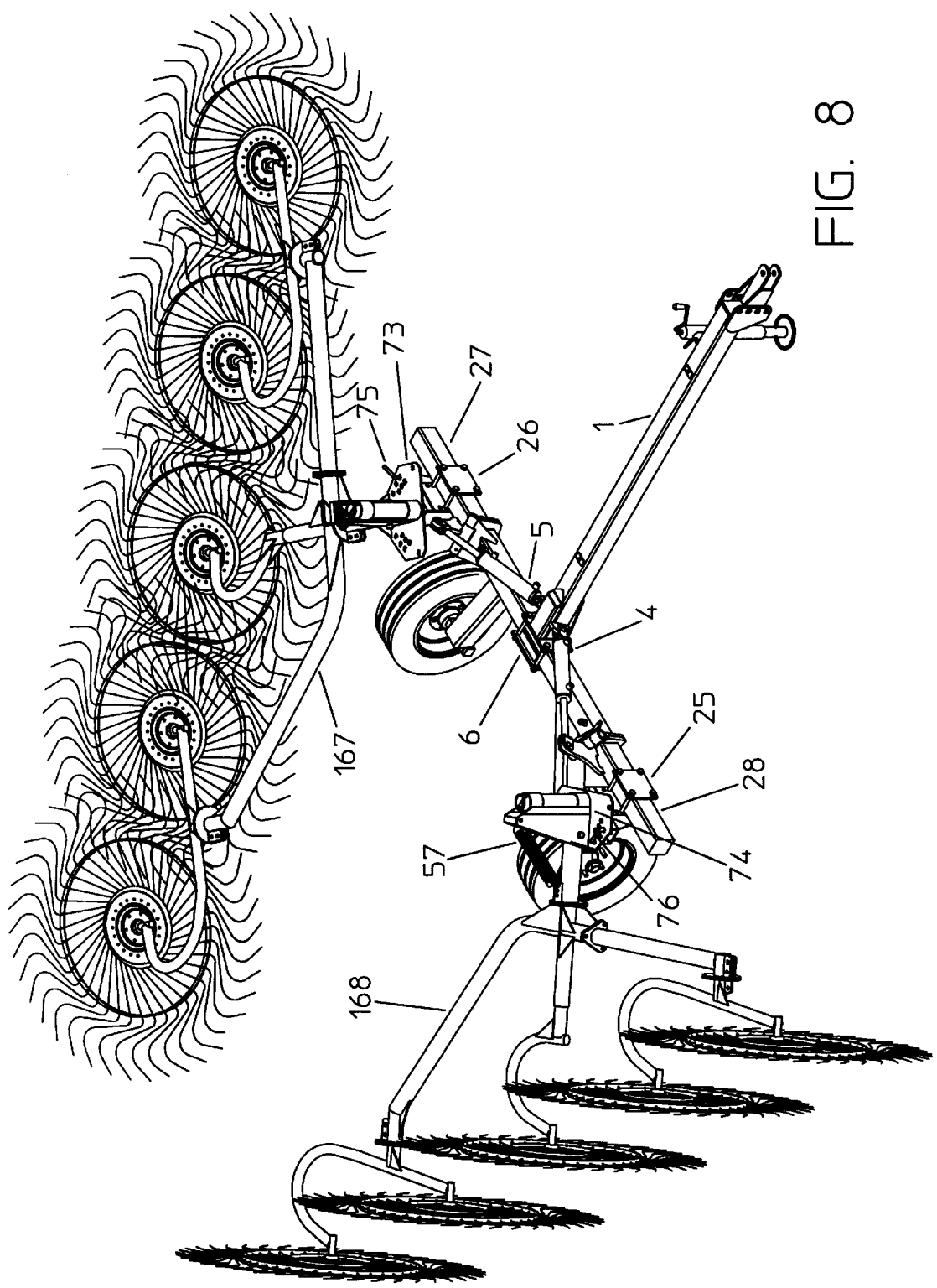
FIG. 8 is a perspective view showing a fully assembled embodiment of the hay rake of the invention wherein the arms are in the lowered (or operating) position.
Figure 9:
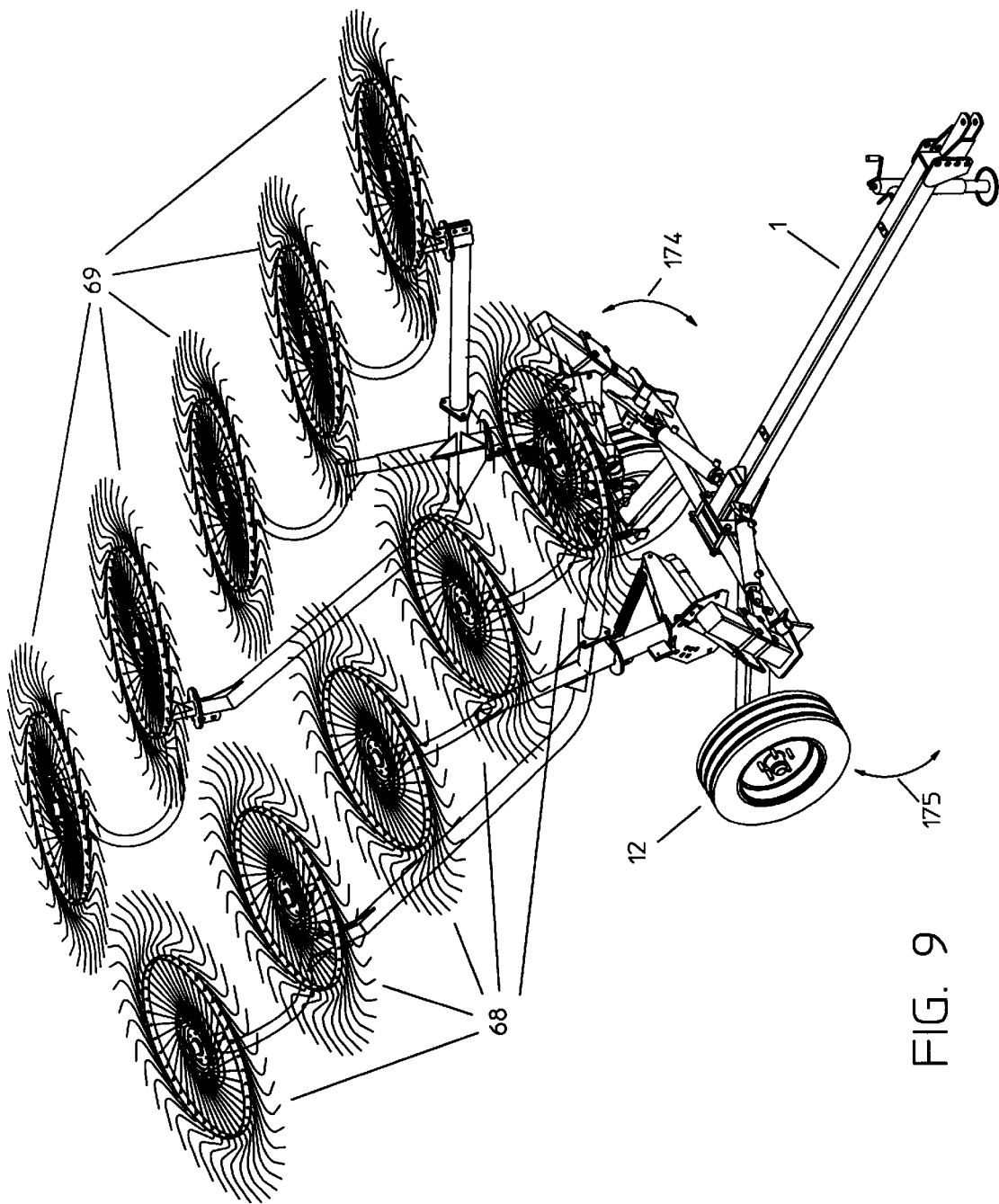
FIG. 9 is a perspective view showing a fully assembled embodiment of the hay rake of the invention wherein the arms are in the raised (or transport) position.
Figure 10:
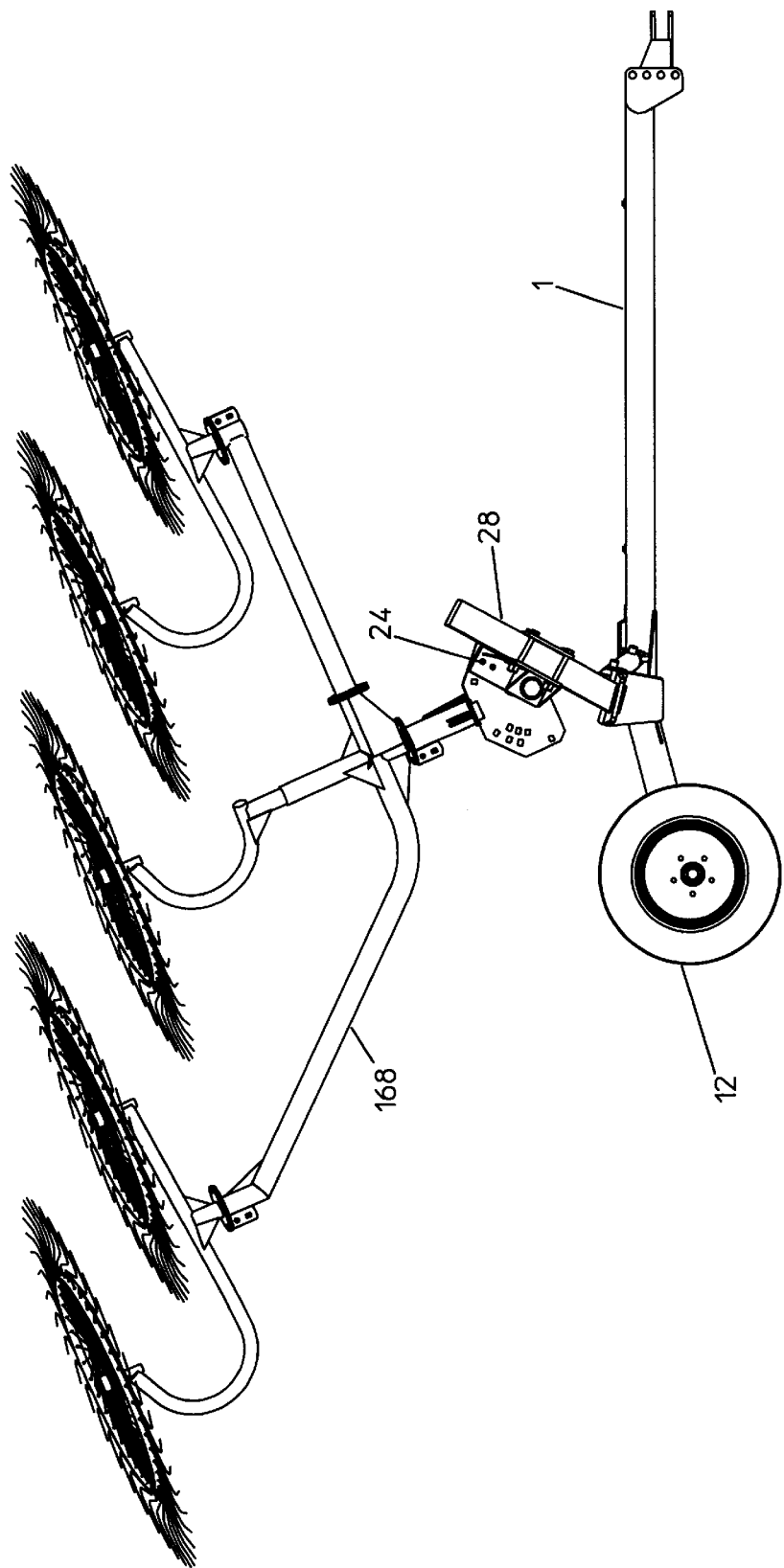
FIG. 10 is a side view showing a fully assembled embodiment of the hay rake of the invention wherein both arms are in the raised (or transport) position.
Figure 11:
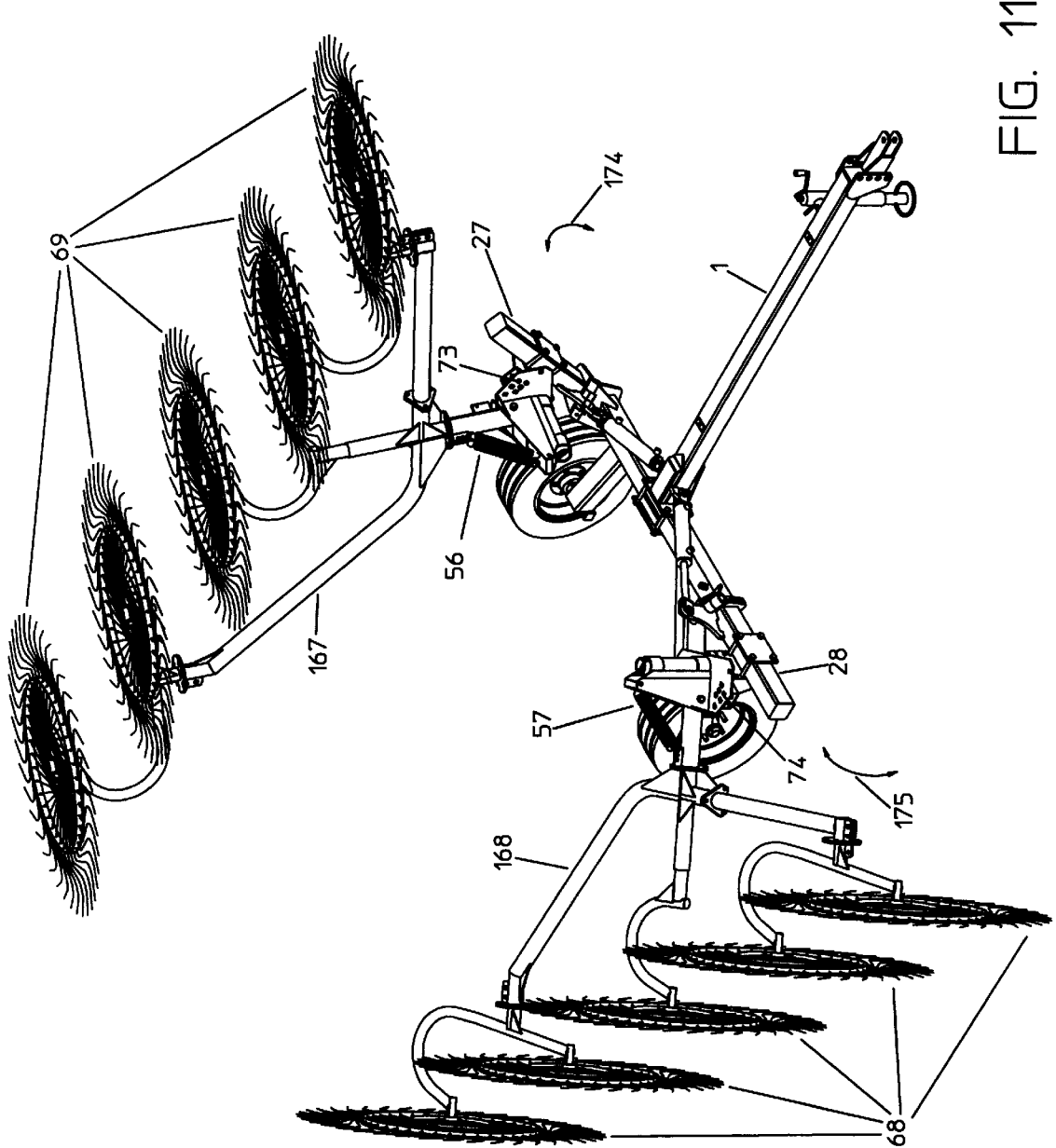
FIG. 11 is a perspective view of a fully assembled embodiment of the hay rake of the invention in which one arm is in the lowered (or operating) position and one arm is in the raised (or transport) position.

As discussed above, the rake arms may be raised for transport or lowered for the raking operation. This is accomplished by actuating hydraulic cylinders 4, 5. When the hydraulic cylinder 4 is retracted, it causes the right lateral element 162 to rotate about the hinge pin 14 to the raised position. Similarly, when the hydraulic cylinder 5 is retracted, it causes the left lateral element 161 to rotate about the hinge pin 15 to the raised position. Conversely, when hydraulic cylinders 4 or 5 are extended, they cause the right and left lateral element 162, 161 to rotate about the hinge pins 14 and 15, respectively, to the lowered position. In this manner, the rake arm assemblies 167, 168 may rotate as indicated by directions arrows 175, 174 between raised and lowered positions. FIGS. 8 and 9 illustrate the hay rake of FIG. 7 from a perspective view in the raised and lowered positions. In FIG. 8 the rake arm assemblies 167, 168 are in the lowered or operating position, and in FIG. 9 the rake arm assemblies 167, 168 are rotated into the raised or transport position. FIG. 10 is a side view of the hay rake with rake arm assemblies 167, 168 in the raised or transport position. FIG. 11 shows the hay rake in a perspective view with rake arm 168 in the lowered position and rake arm 167 in the raised position.

Figure 12:
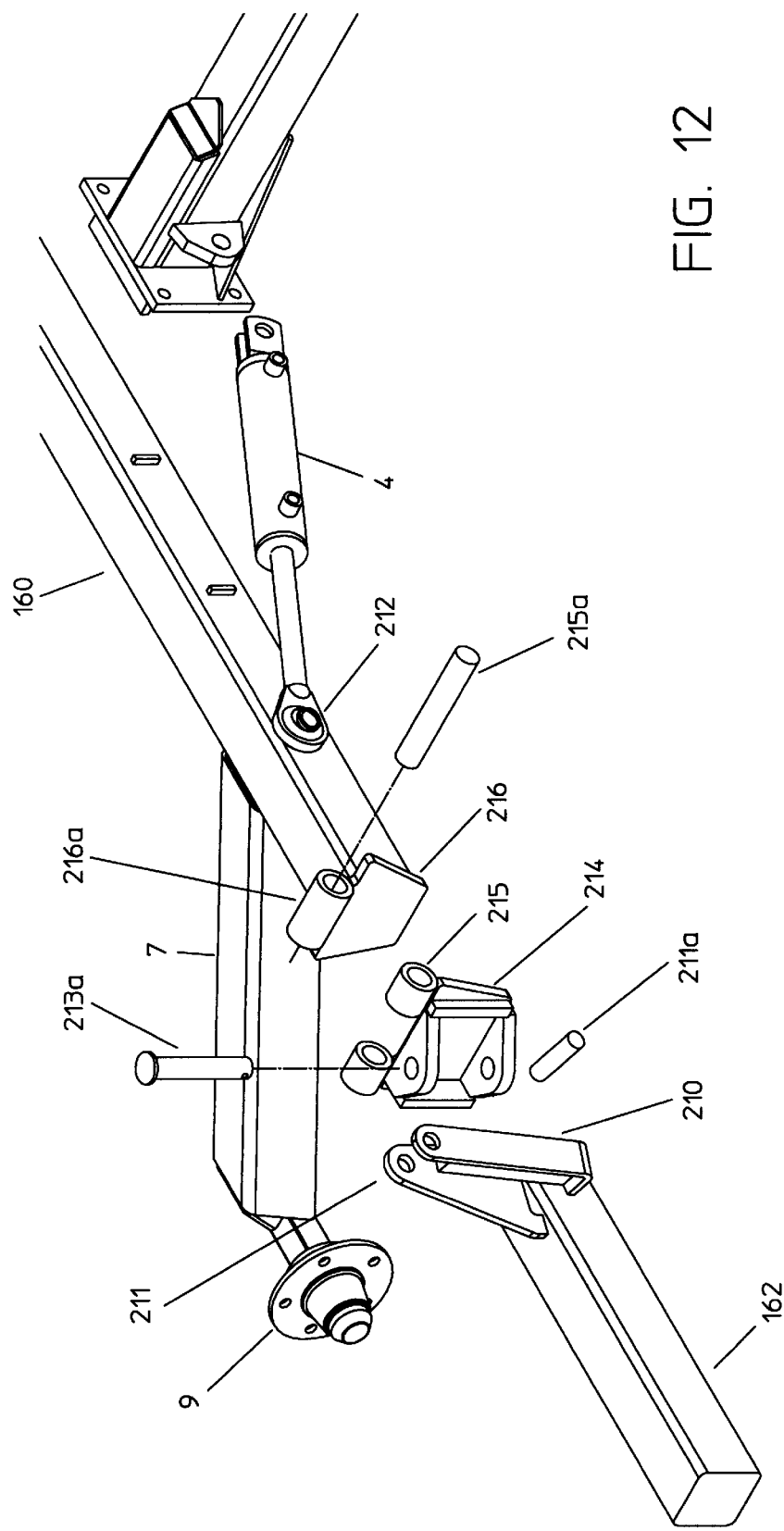
FIG. 12 is an exploded perspective view of an alternative embodiment of a portion of the rake according to the present invention showing a double-axis hinge mechanism for pivotally connecting the lateral elements to the central frame element.

One of ordinary skill in the art will appreciate that the lateral elements may be pivotally connected to the central member 160 in various ways and with different hinge mechanisms. For example, as shown in FIG. 12, in another embodiment of the invention the lateral elements 162 and 161 may be connected to the central cross member 11 by a novel double-axis hinge 214. For convenience, this embodiment will be described only with reference to lateral element 162, but one of ordinary skill in the art will appreciate that this discussion is clearly applicable to lateral element 161, i.e., the double-axis type hinge 214 may be, and is preferably, used on both the right and left lateral elements 161, 162.

The double-axis hinge 214 is provided with receptacle 215, which is adapted to receive pin 215.1 in the horizontal position and with receptacle 213, which is adapted to receive pin 213.1 in the vertical position. The double-axis hinge 214 allows the lateral element to rotate vertically (upwardly) and horizontally (inwardly) separately and in sequence along the two axes of the hinge (e.g. the vertical axis along pin 213.1 and the horizontal axis along pin 215.1).

Right lateral element 162, which includes extension bar 28, is adapted to attach to the double-axis hinge 214 at the vertical axis by providing a receptacle which complements receptacle 213 and is adapted to receive pin 213.1. Lateral element 162 may thus be pivotally joined to the double-axis hinge 214 by inserting pins 213.1 into the complimentary receptacles in the double-axis hinge 214 and lateral element 162. Pin 213 thus provides a vertical axis about which lateral element 162 rotates. The double-axis hinge 214 may be attached to the right end of the central cross member 11 at the horizontal axis. The right end of the central cross member 11 is adapted to attach to the double-axis hinge 214 by affixing to it a horizontal hinge member 216 having a receptacle 216.1, which complements receptacle 215 and is adapted to receive pin 215.1. Thus, the lateral element 162 may also rotate about the horizontal axis defined by pin 215.

The lateral element 162 includes a lever arm 210 to which hydraulic cylinder 4 may be attached. Preferably, the hydraulic cylinder 4 has at its extremity a ball joint 212 adapted to allow both vertical and horizontal movement. The lever arm 210 includes a connection point 211 which allows the use of pin 212 to rotatably connect the lever arm 210 to the ball joint of the hydraulic cylinder 212. Alternatively, the ball joint may be welded to the lever arm 210 and the cylinder may be provided with a U-shaped bracket adapted to receive the ball joint 212.

Figure 13:
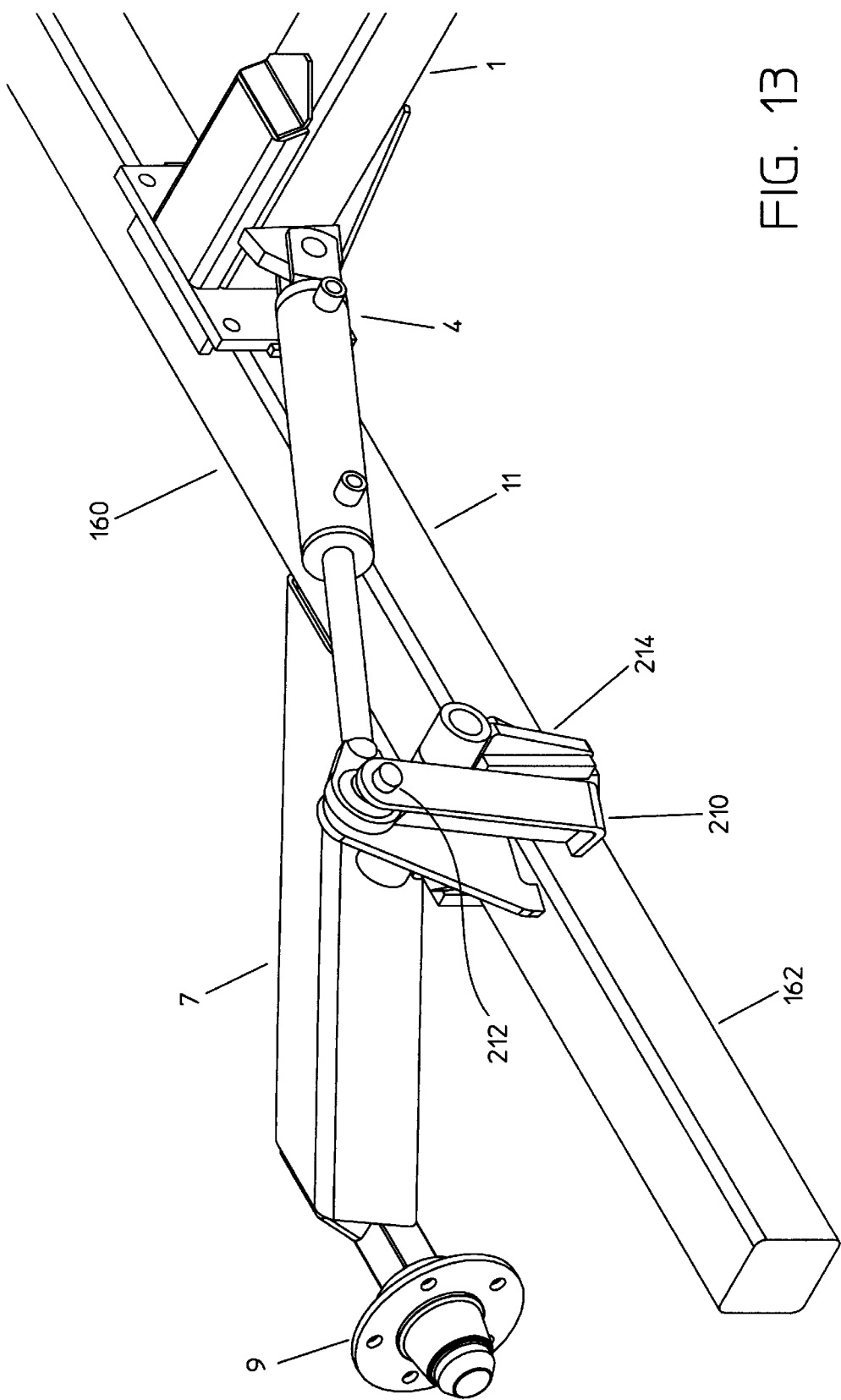
FIG. 13 is a perspective view of the portion of the rake of FIG. 12 in the assembled position.
Figure 14:
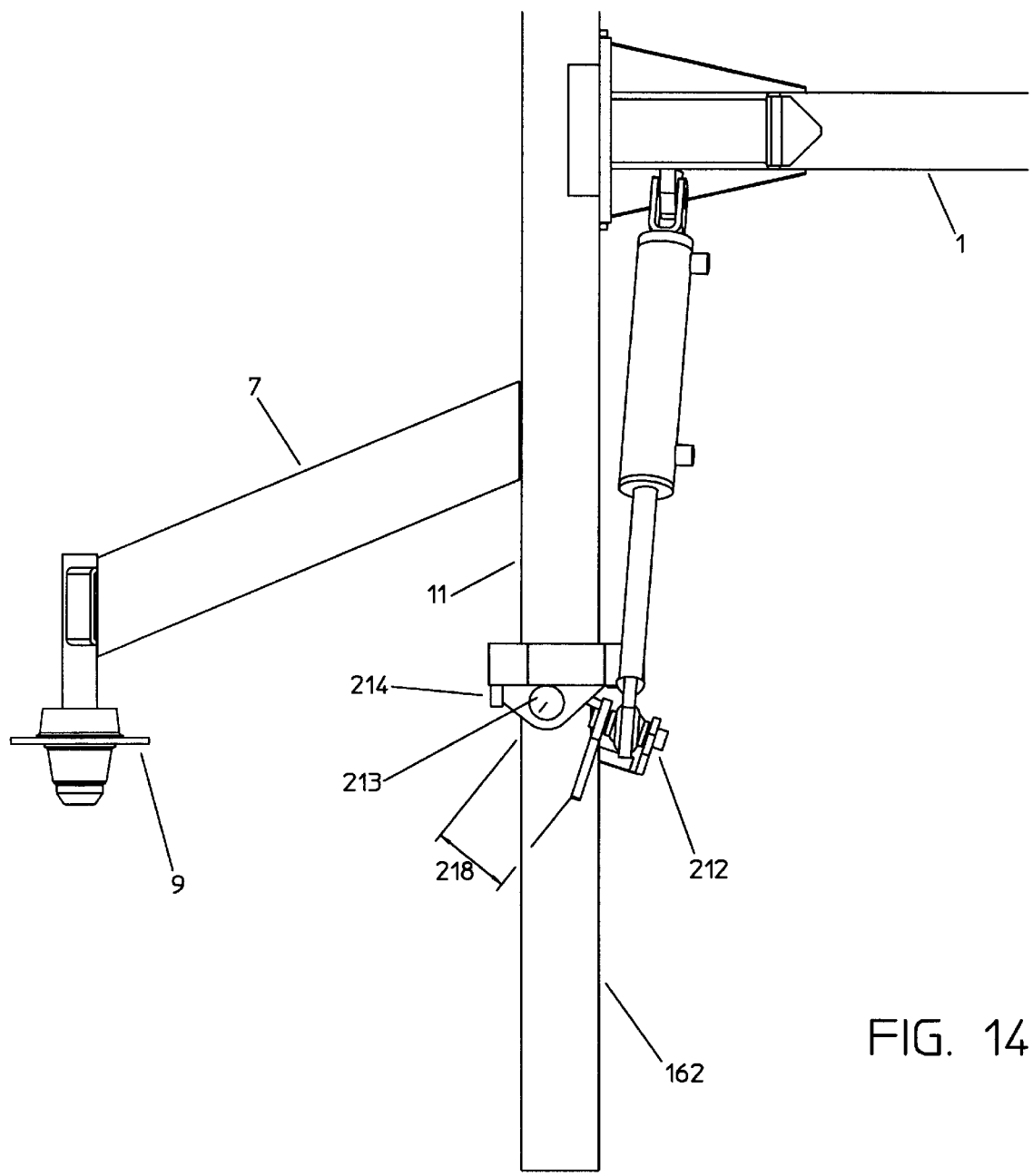
FIG. 14 is a top view of the portion of the rake of FIG. 13.
Figure 15:
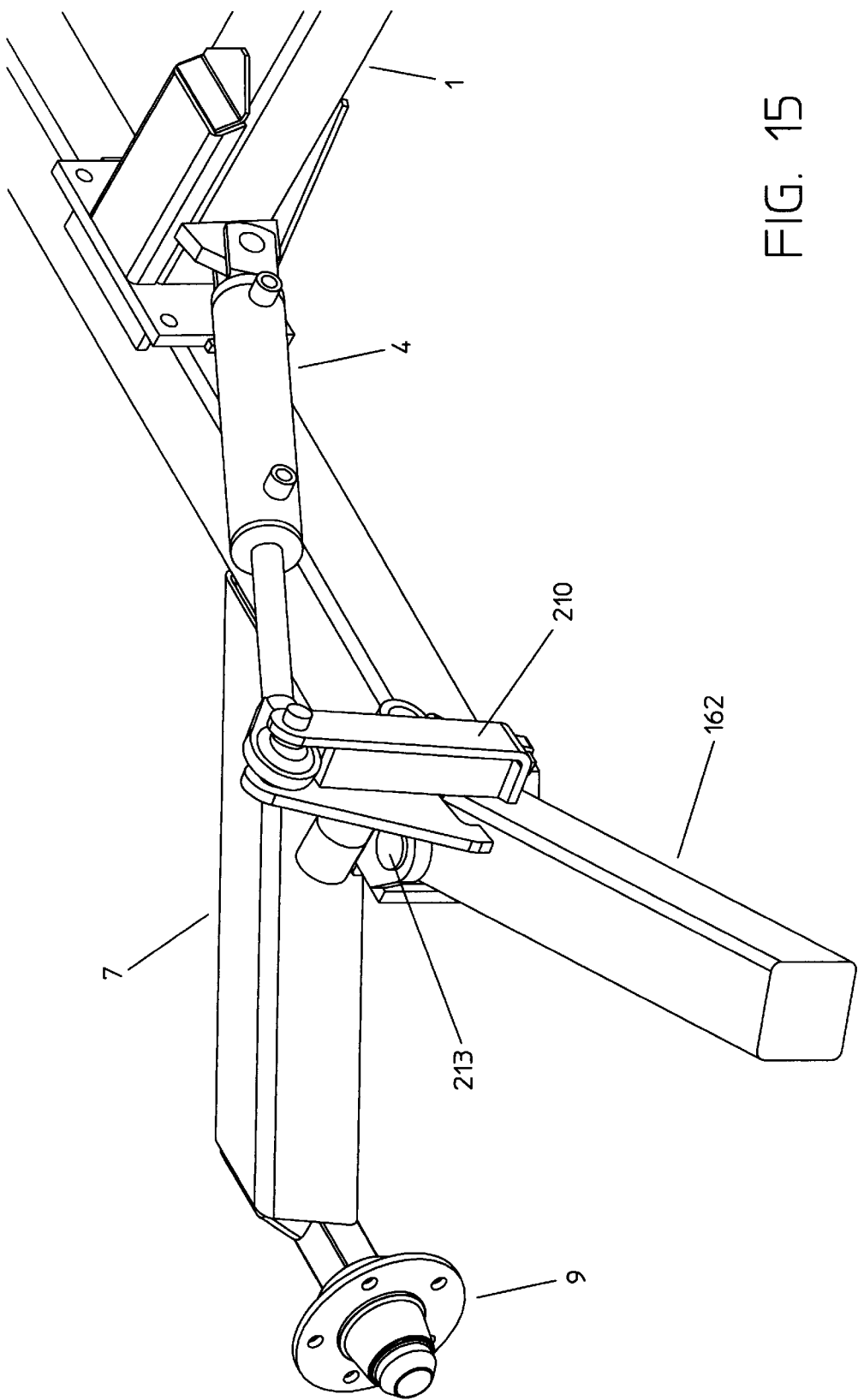
FIG. 15 is a perspective view of the portion of the rake of FIG. 13 in an intermediate position between the operating position and the transport position.
Figure 16:
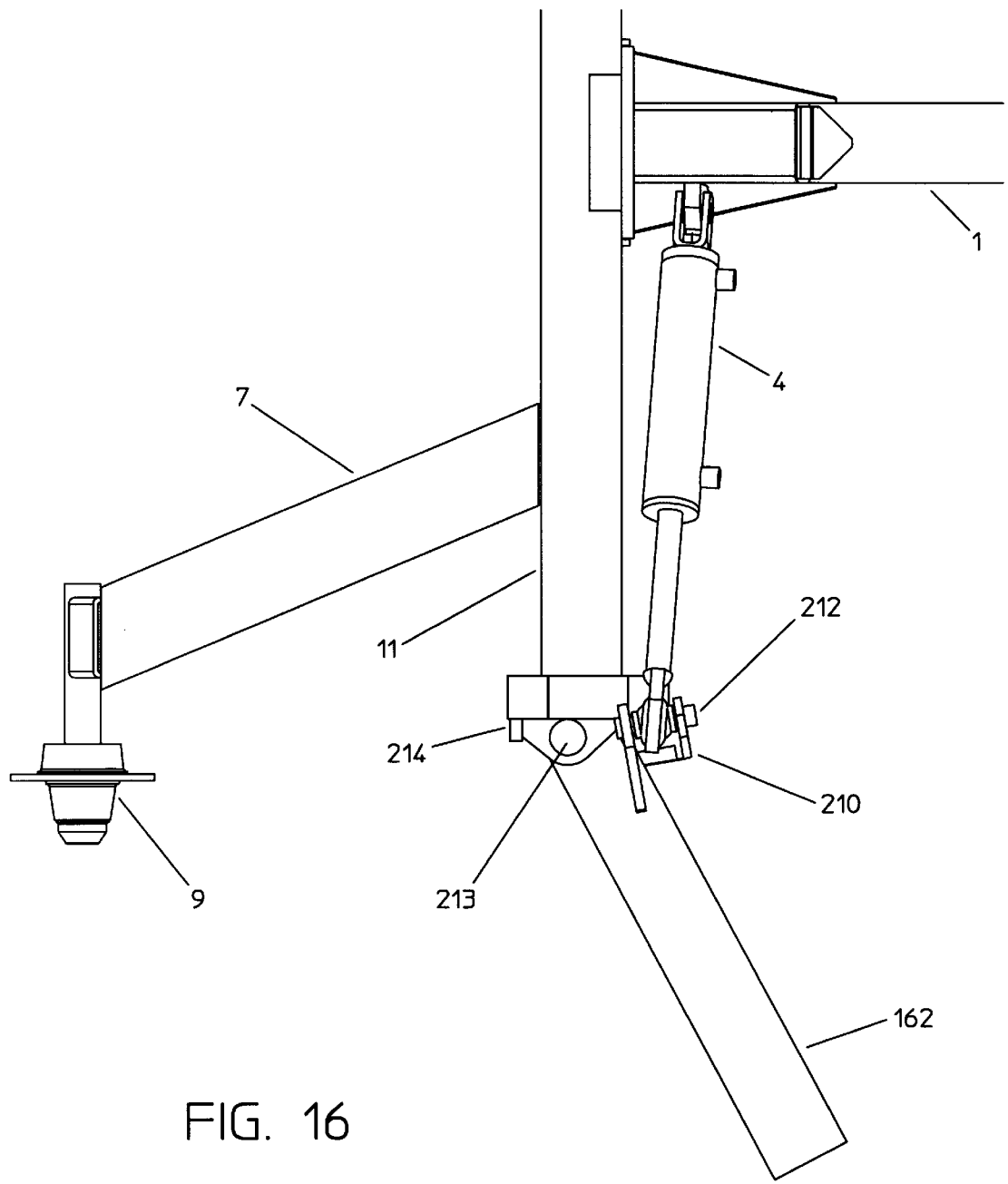
FIG. 16 is a top view of the portion of the rake shown in FIG. 15.
Figure 17:
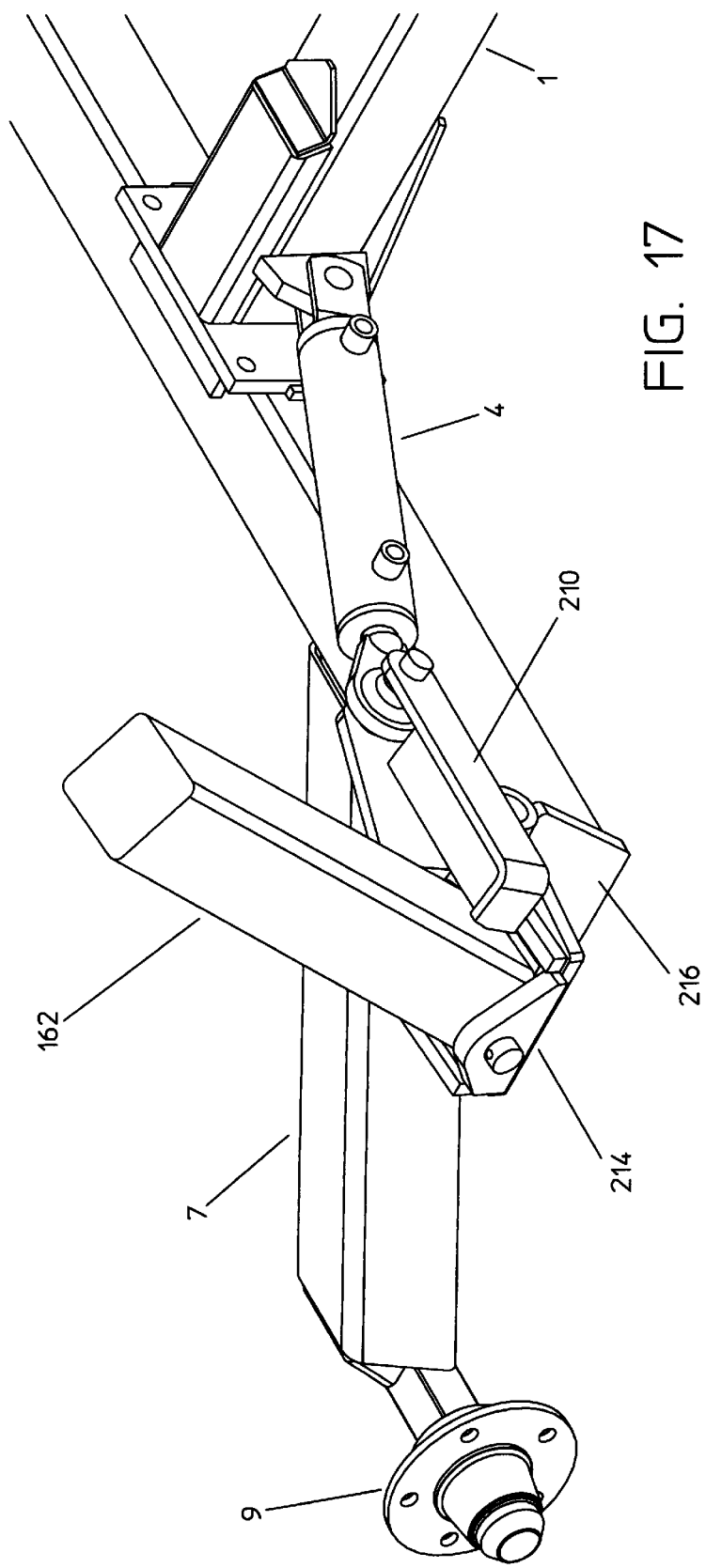
FIG. 17 is a perspective view of the portion of the rake of FIG. 13 shown in the raised or transport position.
Figure 18:
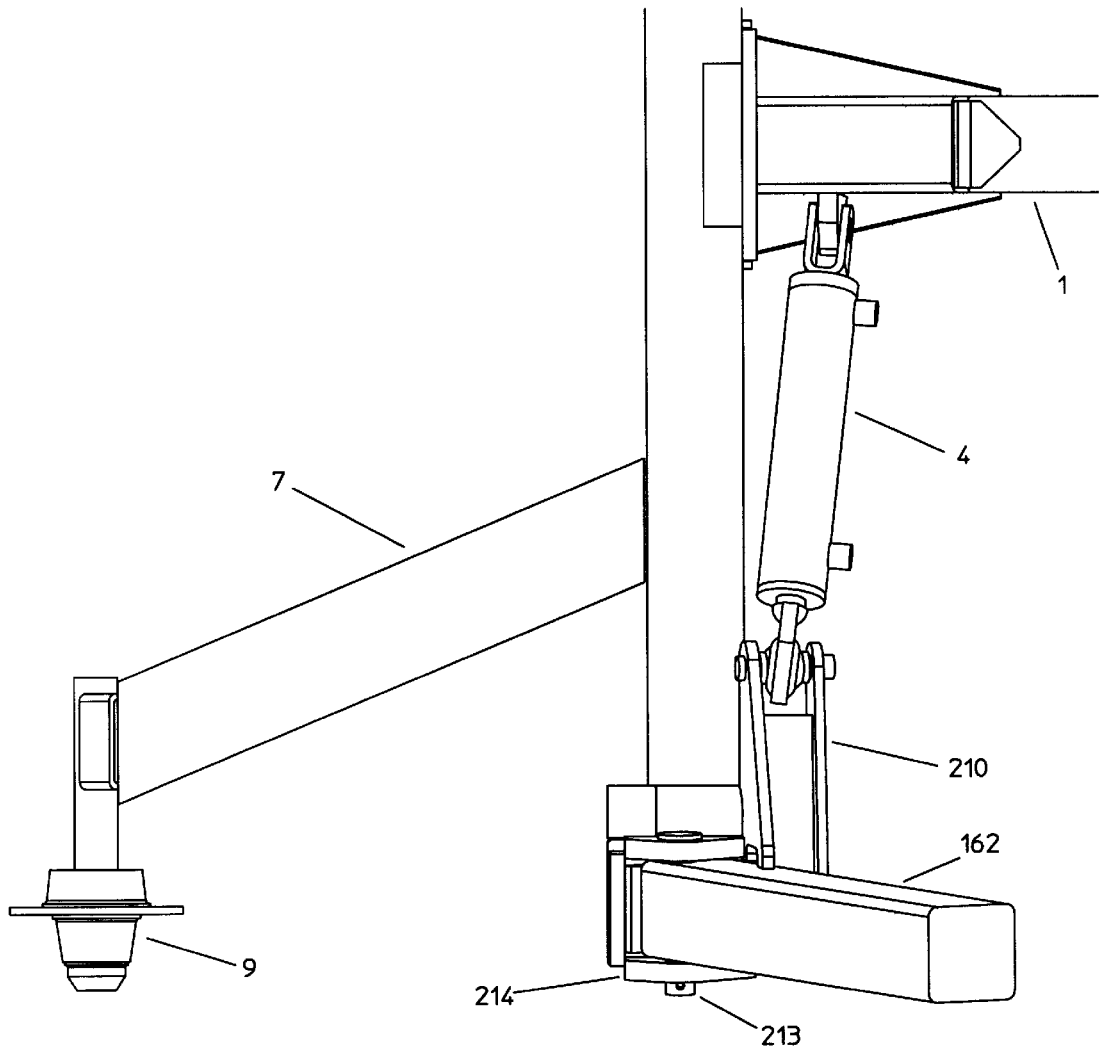
FIG. 18 is a top view of the portion of the rake shown in FIG. 17.

FIGS. 12–18 show the positions of this double-axis hinge embodiment of the hay rake of the present invention as the rake arms are lifted to the transport position and lowered to the operating position. With reference to the Figures, FIGS. 13 and 14 show a portion of the rake in the open or operating position with lateral element 162 extending substantially linearly from the central cross member 11. When cylinder 4 retracts, the lateral element 162 first rotates horizontally around the vertical axis defined by pin 213.1 as shown in FIGS. 15 and 16, to attain a position intermediate between the operating position and the transport position. When the lateral element can rotate no further about the vertical axis defined by 213.1, it moves vertically around the horizontal axis defined by pin 215.1 as shown in FIGS. 17 and 18 to reach the raised or transport position. To control the sequence of the horizontal and vertical rotation the double-axis hinge 214 may include, for example, a mechanical stop such as bar 217 in FIG. 12. The mechanical stop can restrict the rotation so that the lateral element 162 will have a limited rotation about the axis of pin 213.1. Thus when the lateral element 162 has rotated until some portion of the lateral element 162 or some portion of the lever arm 210 attached to it comes into contact with the mechanical stop 217, then the lateral element 162 will be prevented from further rotation about the axis defined by pin 213.1. Continued retraction of hydraulic cylinder 4 will thus result in rotation of the lateral element 162 about the axis defined by pin 215.1.

One of ordinary skill in the art will recognize that the double-axis hinge 214 may be configured in different ways. For example, it may be configured such that the rotation about the horizontal axis occurs before the rotation about the vertical axis.

The double-axis hinge arrangement has advantages over a single-axis hinge, such as providing an additional degree of freedom through which the rake arm assemblies 167, 168 may be positioned. For example, the transport position may be adjusted by controlling the amount of rotation about each of pins 213.1 and 215.1 using mechanical stops to provide specific ranges of rotation about the axes.

Figure 19:
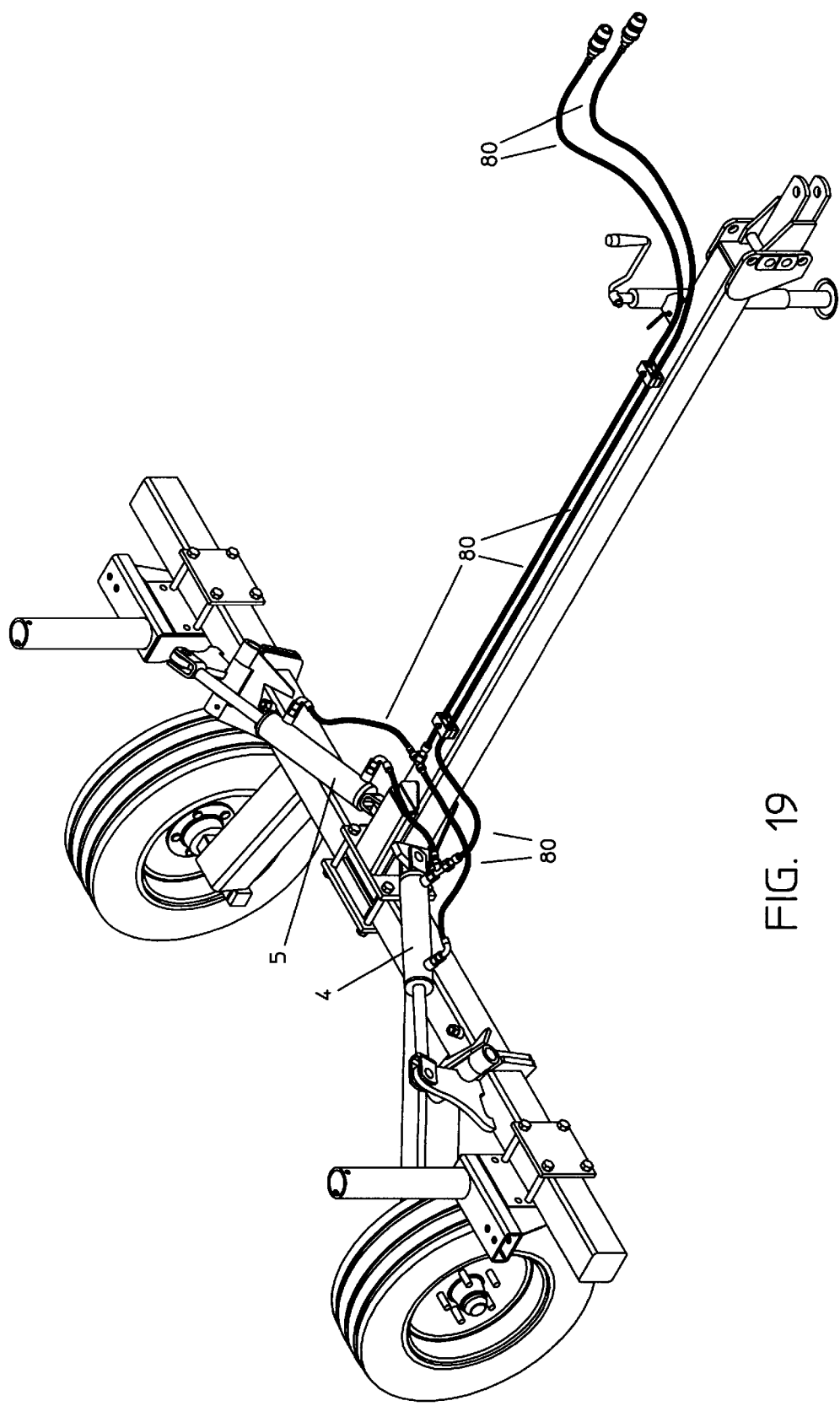
FIG. 19 is a perspective view of one embodiment of a main frame portion of the rake of the present invention showing one embodiment of the principle hydraulic actuating system.

One of ordinary skill in the art will also recognize that the hydraulic lines may be configured in various ways. For example, FIG. 19 shows the main frame 200 having a first embodiment of hydraulic lines 80. In this embodiment, the hydraulic lines 80 lead from the front of the tow bar 1 from where they may be connected to a hydraulic pressure supply (not shown) to the rear portion of the tow bar 1 where the hydraulic cylinders 4, 5 are located. In the embodiment shown, hydraulic cylinders 4 and 5 are double acting hydraulic cylinders, as are known in the art. Thus, hydraulic lines 80 are provided to both ends of the hydraulic cylinders. According to the embodiment of FIG. 19, the upwards and downwards movements of the rake arm assemblies 167, 168 according to the arrows 174 and 175 (as shown, for example, in FIGS. 9 and 11) may be executed by both arms contemporaneously as provided by the connection of the hydraulic lines being in parallel.

Figure 20:
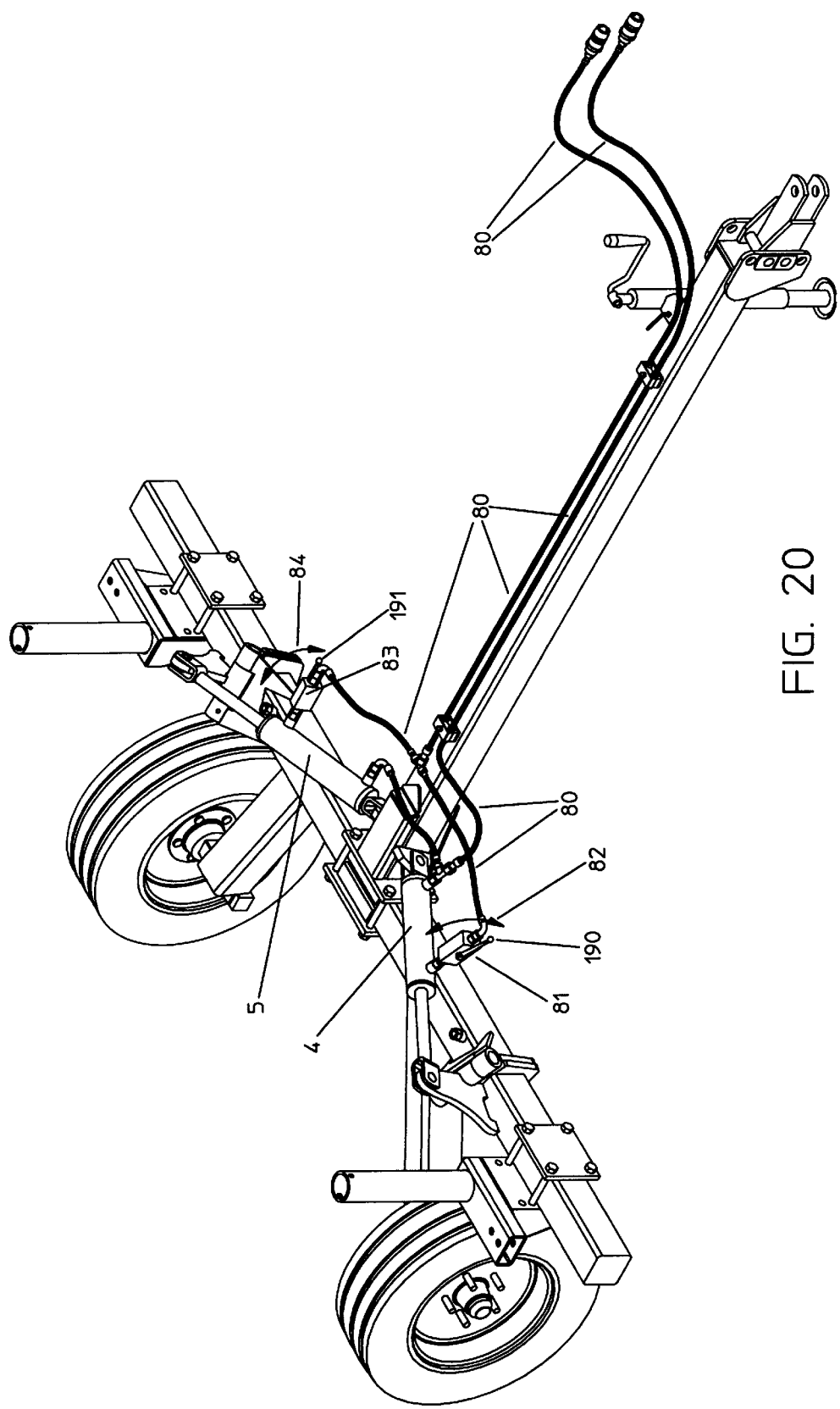
FIG. 20 is a perspective view of one embodiment of a main frame portion of the rake of the present invention showing another embodiment of the principal hydraulic actuating system.

Manually actionable valves 81, 83 may also be installed in the hydraulic lines 80 leading to the hydraulic cylinders 4, 5, as shown in FIG. 20. Thus, by opening and closing levers 190, 191 of the manually actionable valves 81, 83, as indicated by arrow 84, the hydraulic cylinders 4, 5 may act independently of each other. For example, one valve 81 may be closed while the other valve 83 is opened, thus hydraulic cylinder 4 would be activated and hydraulic cylinder 5 would not.

Figure 21:
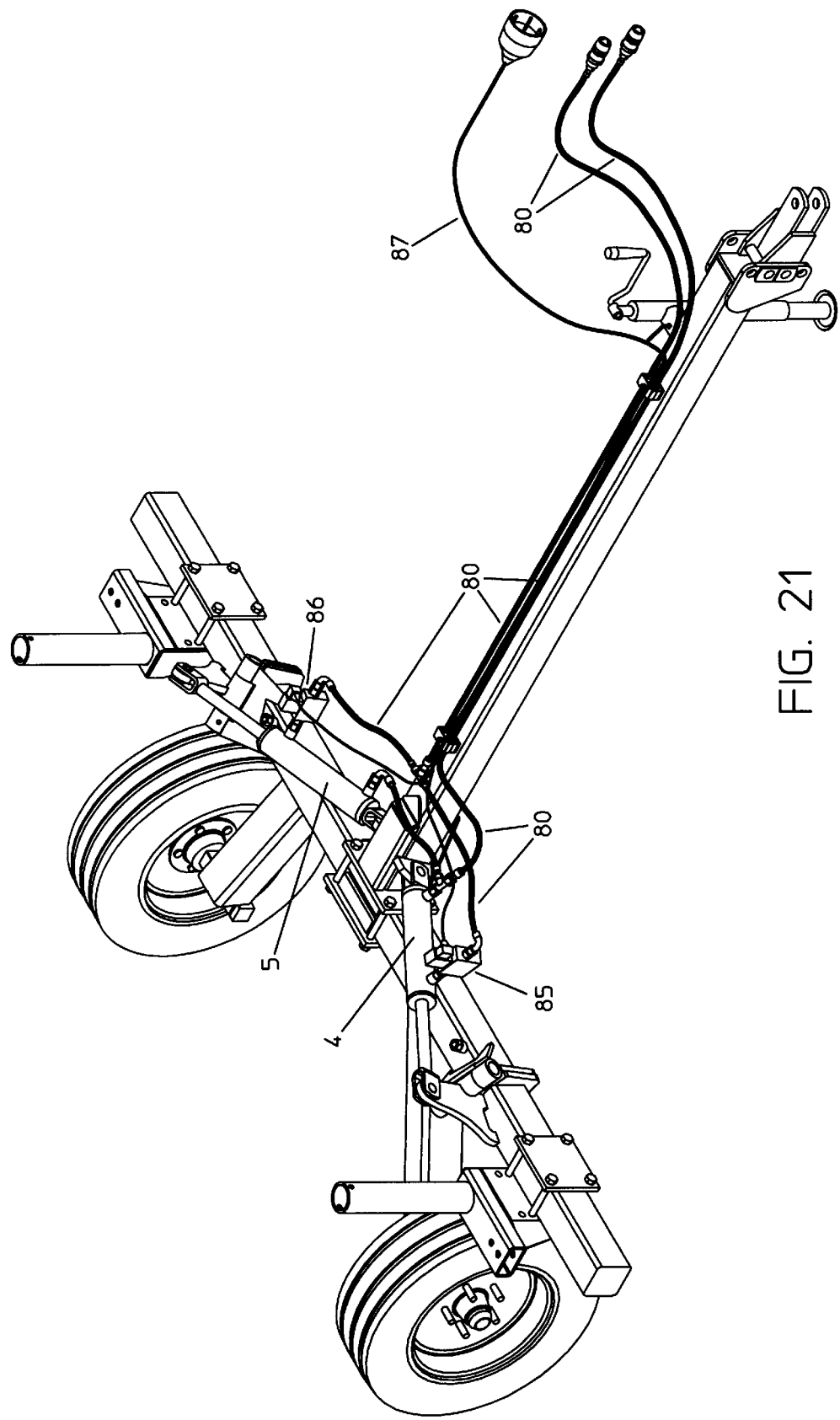
FIG. 21 is a perspective view of one embodiment of a main frame portion of the rake of the present invention showing still another embodiment of the principal hydraulic actuating system.

FIG. 21 shows yet a further embodiment of the hydraulic actuating system in which electromechanical valves 85, 86 are installed in the hydraulic lines 80 leading to the hydraulic cylinders 4, 5. Thus, the upward and downward motion of the rake arm assemblies 167, 168 can be remotely controlled, with each hydraulic cylinder 4 or 5 operating independently of the other via electronic signals provided to the valves 85, 86 by the electrical wire 87.

Figure 22:
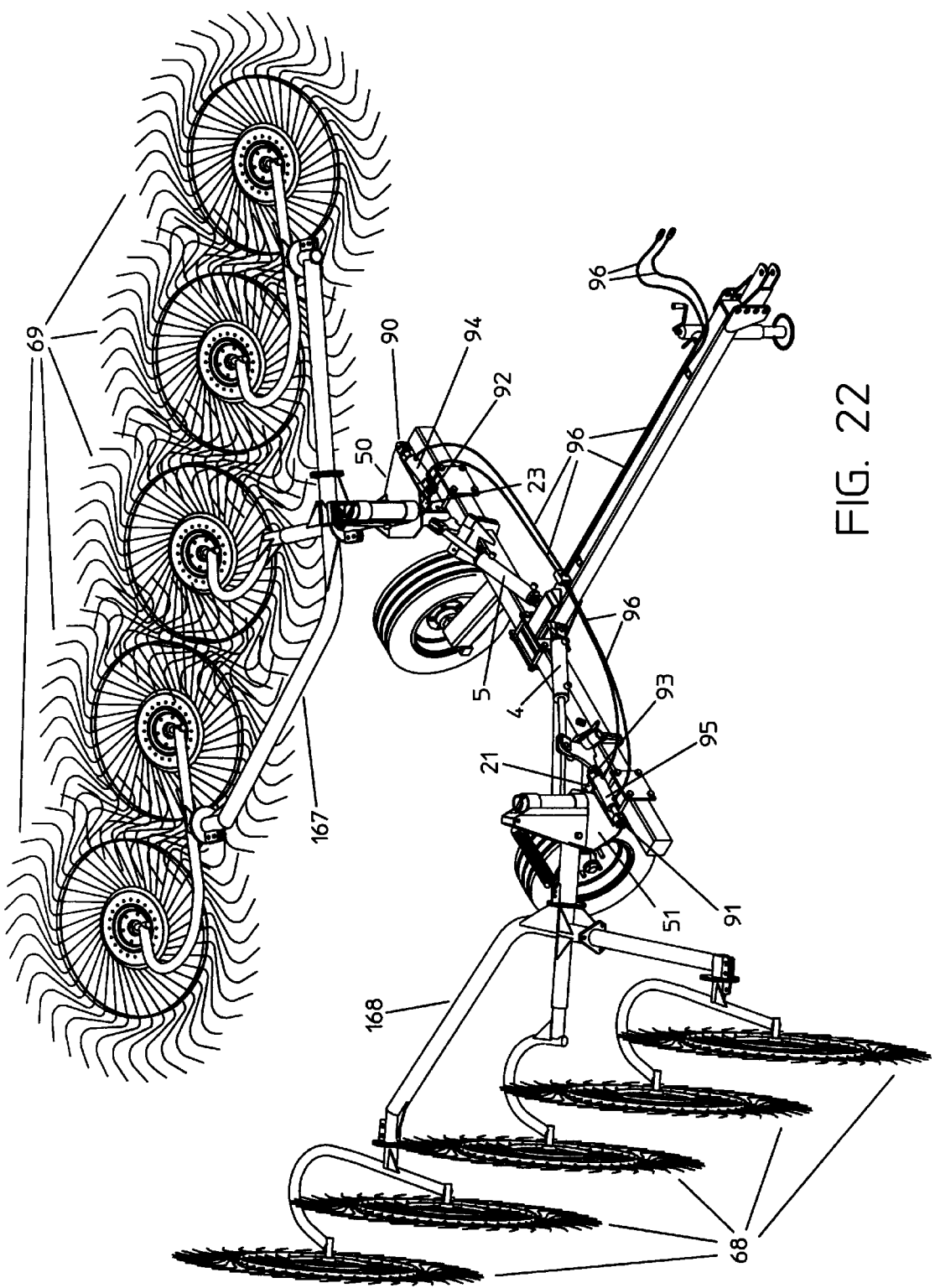
FIG. 22 is a perspective view of an embodiment of the hay rake which includes actuating units to rotate the rake arms angularly along a horizontal axis.

In yet another embodiment of the hay rake of the present invention, the angular orientation of the rake arm assemblies 167, 168 as indicated by direction arrows 172 and 173 (as shown in FIG. 7) may be controlled by a hydraulic actuating system. As shown in FIG. 22, the hydraulic actuating system includes hydraulic cylinders 94, 95, cylinder mounts 90, 91, disposed on the base plates 50, 51, cylinder mounts 92, 93 disposed on the base plates 18, 21, and the hydraulic lines 96. Hydraulic cylinder 95 is connected between base plates 21, 51, such that hydraulic activation of cylinder 95 causes a relative rotation of the base plates 21, 51. Similarly, hydraulic cylinder 94 may be used to change the relative angular position of base plate 50 relative to base plate 18 as desired.

Figure 23:
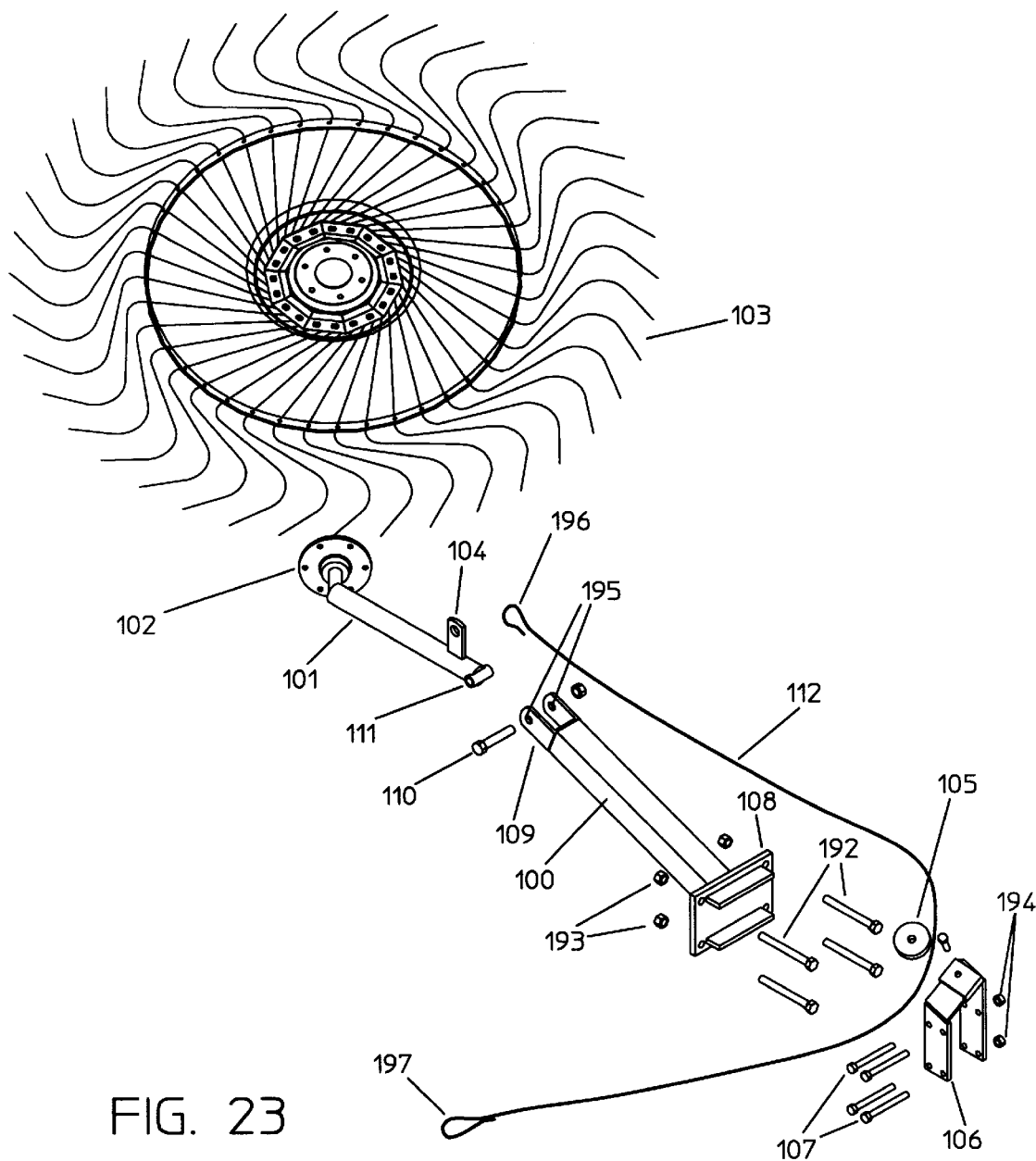
FIG. 23 is an exploded view showing the disassembled parts of a rear rake arm according to an embodiment of the present invention.
Figure 24:
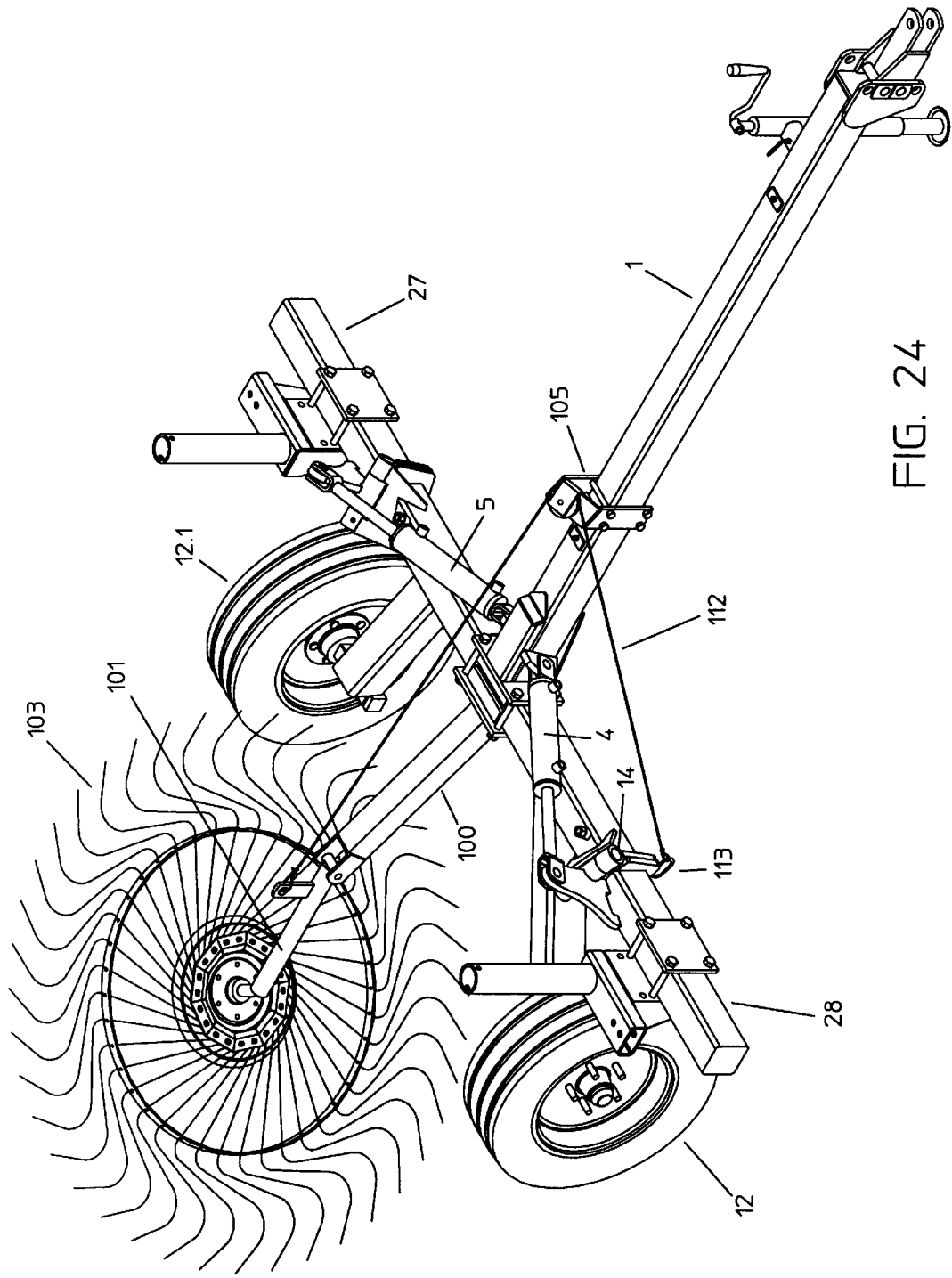
FIG. 24 is a perspective view showing the rear rake arm of FIG. 23 assembled to the main frame of one embodiment of the hay rake of the present invention.

The hay rake of the present invention may also include an optionally available rear rake wheel 103 that may be attached to the main frame 200, as shown in FIG. 23. An elongated rear element 100 may be fixed to the central frame element 160 of the main frame 200 via a plate 108, bolts 192 and nuts 193. A mounting bracket 109 attached to the end of the elongated rear element 100 has horizontally disposed mounting holes 195. A second elongated element 101 may be pivotably mounted through its axial mount 111 by the insertion of bolt 110 through the aligned mounting holes 195. The second elongated element 101 includes a rotatable hub 102 to which a rear rake wheel 103 may be rotatably mounted. The second elongated element 101 also includes an appendix 104 to which may be attached a cable 112 via attachment loop 196. The cable 112 may be flexible and adapted to absorb frictional forces. As shown in FIG. 24, a pulley 105 may be attached to the tow bar 1 via a pulley support bracket 106, bolts 107, and nuts 194. The cable 112 may be placed in a path from the appendix 104 around the pulley 105 to an appendix 113 on the extension bar 28. Thus, the rear rake wheel 103 may be raised into a transport position or lowered into an operating position through the action of hydraulic cylinder 4 in rotating the lateral element 162 about its rotation pin 14.

Figure 25:
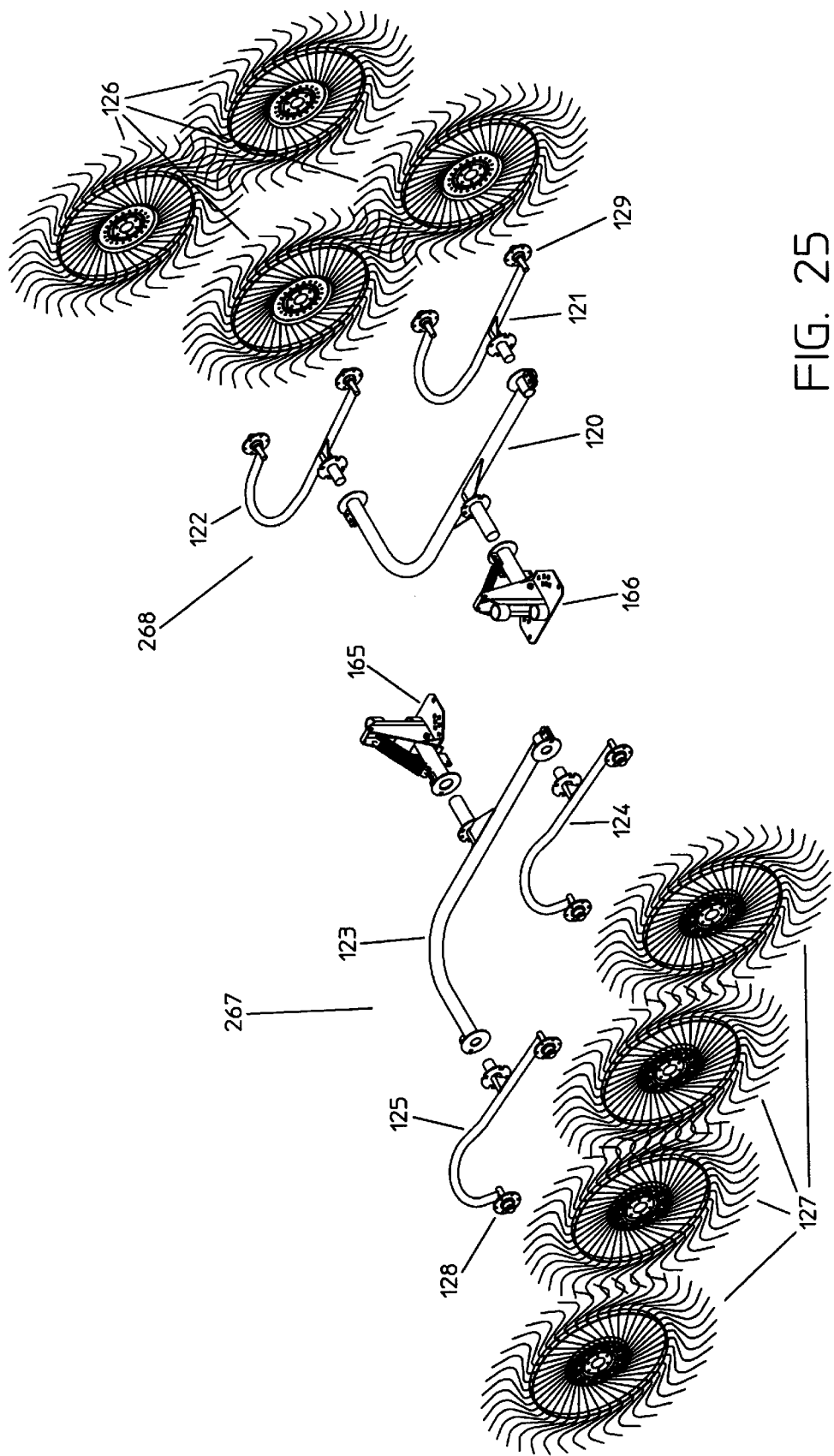
FIG. 25 is an exploded view showing the disassembled parts of the rake arm assemblies of an eight wheel hay rake according to the present invention.
Figure 26:
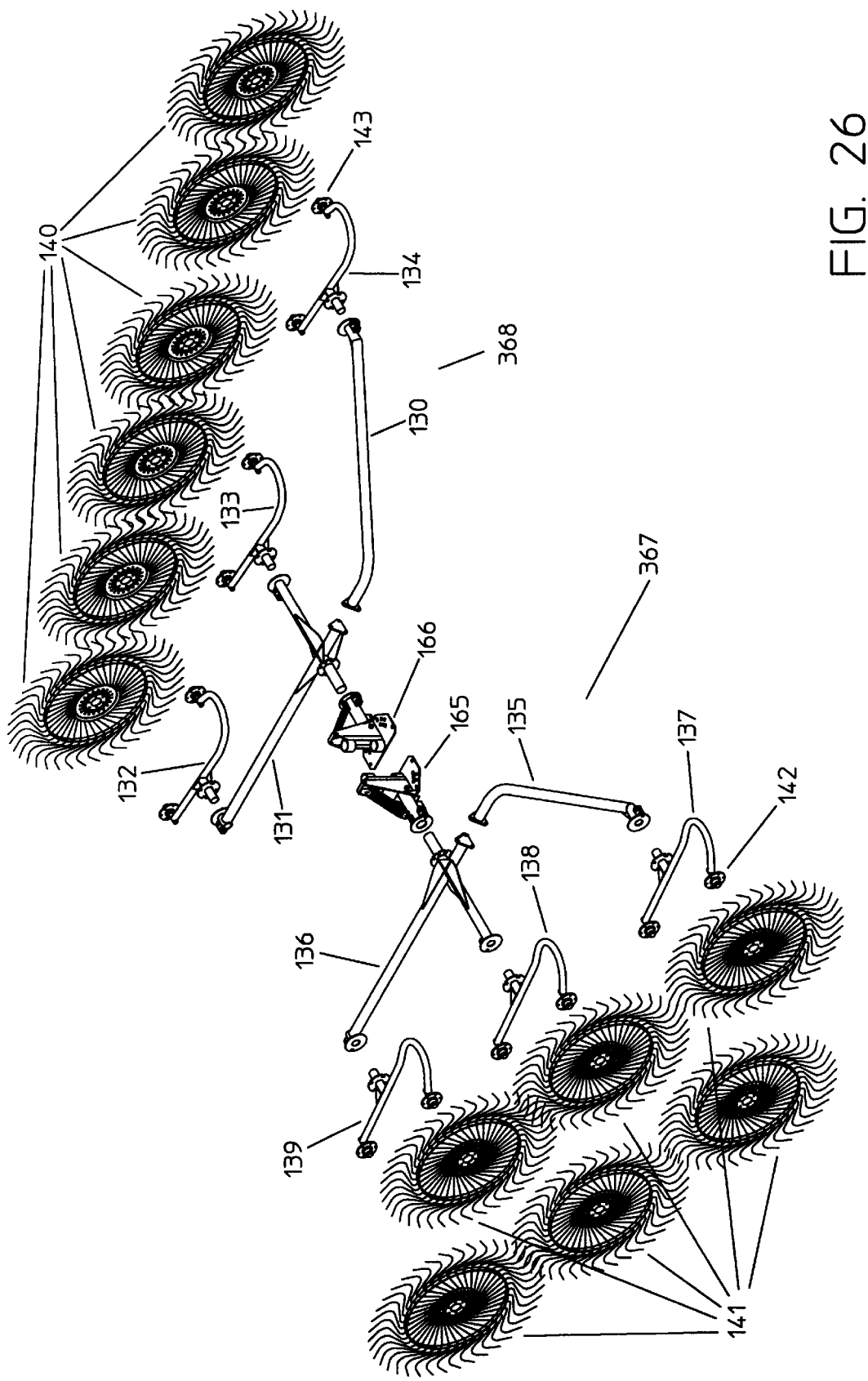
FIG. 26 is an exploded view showing the disassembled parts of the rake arm assemblies of a twelve wheel hay rake according to the present invention.

FIGS. 25 and 26 show alternative embodiments of the present invention in which the number of rake wheels associated with each rake arm is varied. For example, in FIG. 25, each rake arm 267, 268 includes 4 rake wheels 127, 126 rather than 5 rake wheels of the previously disclosed embodiment. To accommodate the rake wheels 127, the rake arm 267 includes only one rake arm section 123 and two rake wheel mounts 124 and 125. The rake wheels are rotatably mounted on wheel hubs 128 attached to the rake wheel mounts 124, 125. The other rake arm 268 similarly includes one rake arm section 120, and two rake wheel mounts 121 and 122, which have wheel hubs 129 for rotatably mounting the rake wheels 126. Thus, the hay rake includes a total of eight rake wheels and may be referred to as a V8 hay rake. In FIG. 26 the hay rake is adapted to have 6 rake wheels 140, 141 on each rake arm 367, 368. To accommodate 6 rake wheels, each rake arm 367, 368 includes a first rake arm section 131, 136, a second rake arm section 130, 135, and three rake wheel mounts 132, 133, 134 and 137, 138, 139. Each rake wheel mount 132, 133, 134 and 137, 138, 139 has two wheel hubs 142, 143 to which the rake wheels 140, 141 may be rotatably mounted.

The hay rake of the present invention may be easily disassembled into relatively few components of relatively homogeneous size by simply removing pins or bolts. For example, with reference to FIG. 5, the main frame 200 may be conveniently disassembled for shipment or storage into 12 principal components (which do not include the hydraulic lines or pieces of minimal dimensions such as plates, pins, nuts, bolts and the like), i.e. (1) the tow bar 1; (2) the central frame element 160; (3) the hitch member 38; (4) the right hydraulic cylinder 4; (5) the left hydraulic cylinder 5; (6) the right lateral element 162; (7) the left lateral element 161; (7) the right mounting stud 164; (8) the left mounting stud 163; (10) the right wheel 12; (11) the left wheel 12.1; (12) and the parking stand 70. Of course, one of ordinary skill in the art will recognize that the number of component parts of the main frame may vary depending upon the embodiment. For example, if the hitch member 38 were welded directly to the tow bar, there would be one less component part; or if the right and left rear appendices 7, 8 were detachably fixed to the central cross member 11, one could, if advantageous, disassemble those and therefore there would be two additional component parts; or if the parking stand were eliminated or fashioned so as to be permanently attached to the tow bar 1, there would again be one less component part.

Each of the components is detachable from the other(s) to which it is connected by simply removing pins or bolts. Thus, once the hydraulic lines and rake arms are removed, the main from 200 of the hay rake of the present invention is conveniently disassembled by removing bolts 40 to disengage the hitch member 38 from the tow bar 1; removing nuts 185, 184 and bolts 36, 37 to disengage the mounting studs 164, 163 from lateral elements 162, 161; removing pins 4.1, 4.2 and 5.1, 5.2 to disengage hydraulic cylinders 4 and 5 from the tow bar 1 and lateral elements 162, 161; removing pins 14, 15 to disengage lateral elements 162, 161 from the central frame element 160; disengaging wheels 12 and 12.1 from the central frame element 160 by removing the bolts attaching them to the rotatable mounts 9, 10; and removing nuts 183 and bolts 35 to disengage the tow bar 1 from the central frame element 160. Although the aforesaid order is preferable, one of ordinary skill in the art will recognize that the order of disassembly may be varied to some extent, i.e. for example the hitch member 38 may be removed last, or the hydraulic lines may be removed after removing the studs, etc.

If the main frame 200 also includes a rear rake wheel assembly as shown in FIGS. 23 and 24, the rear rake wheel assembly may be easily disassembled from the main frame 200 by removing nuts 193 and bolts 192. It may then be further disassembled into 3 component parts by removing pin 110 and dismounting the rear rake wheel 103 from rotatable hub 102. If advantageous, pulley support bracket 106 (together with pulley 105) may be dismounted from the tow member 1 by removing nuts 194 and bolts 107.

If the double-axis hinge embodiment of the present invention is used, hinge 214 may be disengaged from lateral element 162 and central frame member 160 by removing pins 211.1 and 213.1. Alternatively, if advantageous to the packing or storing operation double axis hinge 214 may be disengaged only from lateral element 162 or only from central frame member 160. Thus, central frame member 160 or lateral element 162 would include hinge 214.

Each rake arm may also be conveniently disassembled separately into components of relatively homogenous size. Generally, the components include a plurality of rake wheels, e.g. 68, 69; one or more rake wheel mounts for mounting the rake wheels e.g. 60–62 and 64–67; a connecting element, e.g. 165, 166 for mounting to the main frame 200; and one or more rake arm sections, e.g. 65, 63, 59, 58, 123, 122, for connecting the rake wheel mounts to the connecting element. The number of rake wheel mounts and rake arm sections varies with the number of rake wheels and geometry chosen. For example, a rake arm of a hay rake having four rake wheels on each arm as shown in FIG. 25 may have only one rake arm section and two rake wheel mounts, while a rake arm of a hay rake having eight rake wheels on each arm as shown in FIG. 26 may have two rake arm sections and three rake wheel mounts.

Like the main frame portion of the rake, the rake arms are easily disassembled by simply removing bolts or disengaging components which fit into each other. Thus, once the rake arms are removed from the main frame by removing pins 75, 76, they may be disassembled by removing the rake wheels 68, 69 from the rake wheel mounts 60–62, 64, 66, 67, disengaging the rake wheel mounts from the rake arm sections 58, 59, 63, 65, and disengaging the rake arm sections from the connecting elements 165, 166 by removing nuts and bolts or the like. Thus, bulky rake arms are conveniently disassembled into components of relatively homogenous dimension which can be easily and compactly packaged.

Assembly of the hay rake of the present invention is equally convenient and is generally the opposite of the disassembly. First, for example, rake arm sections 59, 65 may be joined to rake arm sections 58, 63, the assemblies of which may be inserted and bolted to the connecting elements 165, 166, respectively. Next, the rake wheel mounts e.g. 64, 66, 67 and 62, 61, 60 may be mounted and bolted to the rake arm sections; and then the rake wheels 68, 69 may be assembled onto the rotatable rake wheel hubs 72, 71 of the rake wheel mounts, e.g. 64, 66, 67 and 62, 61, 60. The main frame may then be assembled by affixing the hitch member 38 to the tow bar 1 via bolts 40; affixing the tow bar 1 to the central frame element 160 via plate 6 and nuts 183 and bolts 35; mounting wheels 12, 12.1 to the rotatable mounts on central frame element 160; affixing parking stand 70 to tow bar 1 in parking position via pin 78; affixing lateral elements 162, 161 to central frame element 160 via pins 14, 15; affixing hydraulic cylinders 4, 5 to tow bar 1 and right and left lateral elements 162, 161 via pins 4.1, 4.2 and 5.1, 5.2; positioning the hydraulic lines; and affixing mounting studs 164, 163 to lateral elements 162, 161 via plates 25, 26, nuts 184, 185 and bolts 37, 36; and mounting the assembled rake arms 167, 168 on mounting studs 164, 163 via pins 76, 75. A preferred order of assembly/disassembly of the main frame and hay rake arms of the embodiment of the hay rake shown in FIGS. 5–11 is shown in FIGS. 28 to 41. These figures are merely illustrative and one of ordinary skill in the art will recognize that the order of assembly may vary.

When the hay rake of the present invention is disassembled into components as described above, the entire rake can be arranged in a crate 151 suitable for storage or shipping of the hay rake in a manner having maximum compactness as shown in FIGS. 1–4. FIG. 1 shows a disassembled embodiment of the present invention in a storage or shipping configuration. The apparatus in a disassembled configuration provides that the various component parts (as described above) may be conveniently and compactly placed into a single crate 151.

The storage or shipping configuration is preferably a rectangular crate 150 having dimensions determined by the length of the tow bar 1 in length, the diameter of the rake wheels 68, 69 in width, and, more preferably, the length of the base plates 50, 51 of the connecting elements 166, 165 in height. Preferably the length of the crate is a little more than the length of the tow bar 1, the width of the crate is a little more than the diameter of the rake wheels 68, 69 and height of the crate is a little more than the length of the base plates 50, 51. More preferably the length of the crate is not more than about 200 mm greater than the length of the tow bar 1, the width of the crate is not more than about 200 mm more than the diameter of the rake wheels 68, 69, and the height of the crate is not more than about 200 mm more than the length of the base plates 50, 51. Most preferably the length of the crate is not more than about 100 mm greater than the length of the tow bar 1, the width of the crate is not more than about 100 mm greater than the diameter of the rake wheels 68, 69, and the height of the crate is not more than about 100 mm greater than the length of the base plates 50, 51. Thus, for example, if the length of the tow bar is 2.22 meters, the diameter of the rake wheels is 1.4 meters, and the length of the base plate is 0.44 meters, the dimensions of the crate are preferably about 2.3 meters in length, about 1.5 meters in width and about 0.55 meters in height. The dimensions of the crate are preferably about 1.8 to about 2.8 meters in length, about 1 to about 2 meters in width, and about 0.2 to 0.8 meters in height, more preferably 2 to 2.6 meters in length, 1.2 to 1.8 meters in width and 0.4 to 0.6 meters in height, and most preferably 2.3 meters in length, 1.5 meters in width and 0.55 meters in height.

The crate preferably includes dividers of a soft, flexible but sturdy material to separate layers of component parts and a small box 150 for holding the plates, bolts, nuts, pins and other pieces of small dimensions. The soft, flexible, but sturdy material is preferably cardboard or plastic, preferably bubble wrap, or a combination thereof.

Figure 2:
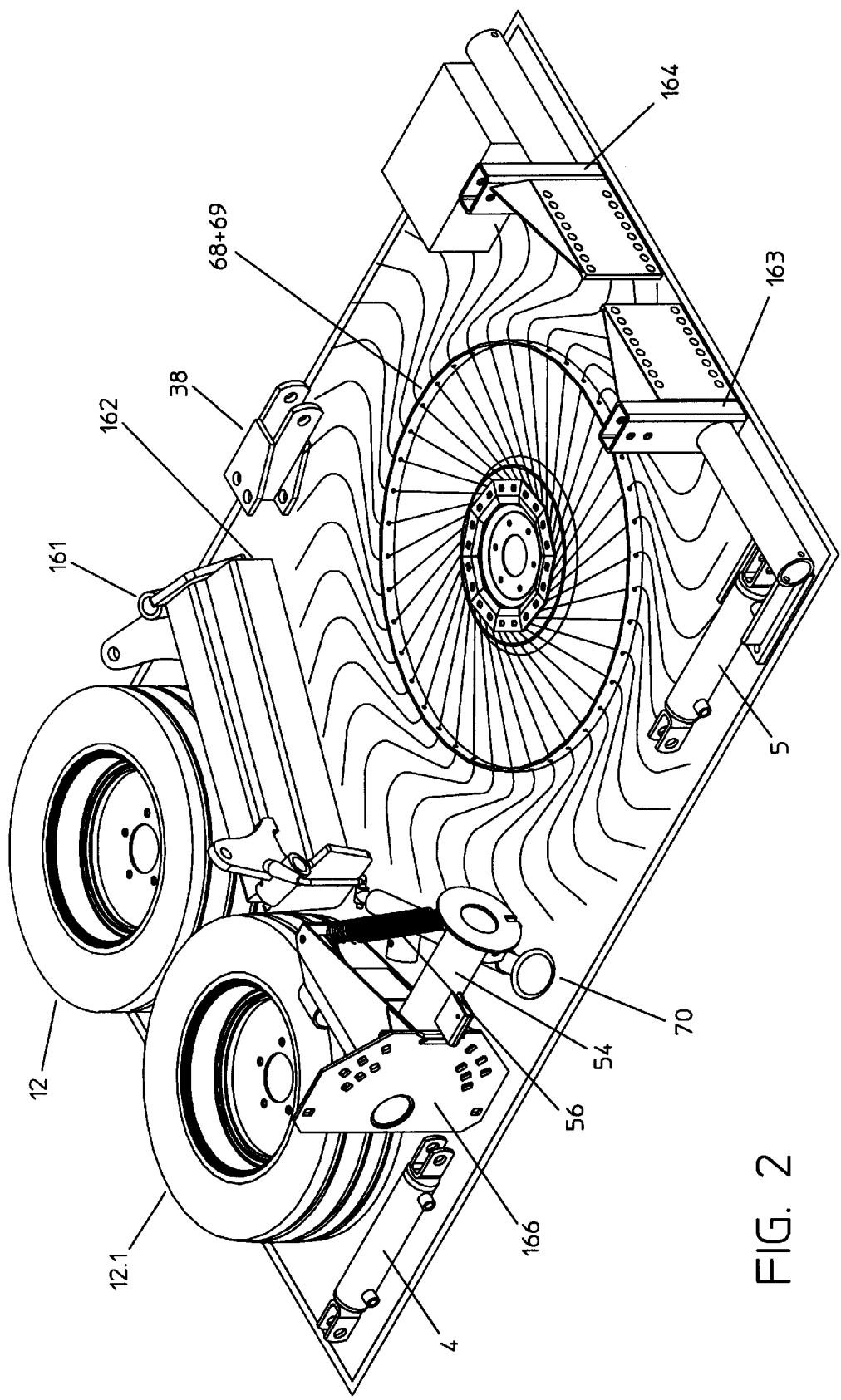
FIG. 2 is a perspective view of the arrangement of the component parts of the embodiment of the hay rake of the present invention as disposed in the lower portion of the crate shown in FIG. 1.

According to the method of the present invention, the components are placed in the crate in preferably three layers. FIG. 2 shows a representative arrangement of component parts of the hay rake that are preferably placed in the first layer, or lower portion of the crate 151. They include, for example, wheels 12, 12.1, hydraulic actuators 4, 5, connecting element 166 (which includes a rake arm head 54 and a spring 56), hitch member 38, parking stand 70, rake wheels 68 and 69, lateral elements 161, 162, and mounting studs 163, 164. Once this layer is formed, it is preferably covered with the divider of soft, flexible, but sturdy material. Since the parts are of varying dimensions, portions of some will extend through the space of the other layers. For example, the length of base plate 50 of connecting element 166 extends through all three layers of the crate, thus determining its height. This is the reason that the divider must be of soft, flexible but sturdy material.

Figure 3:
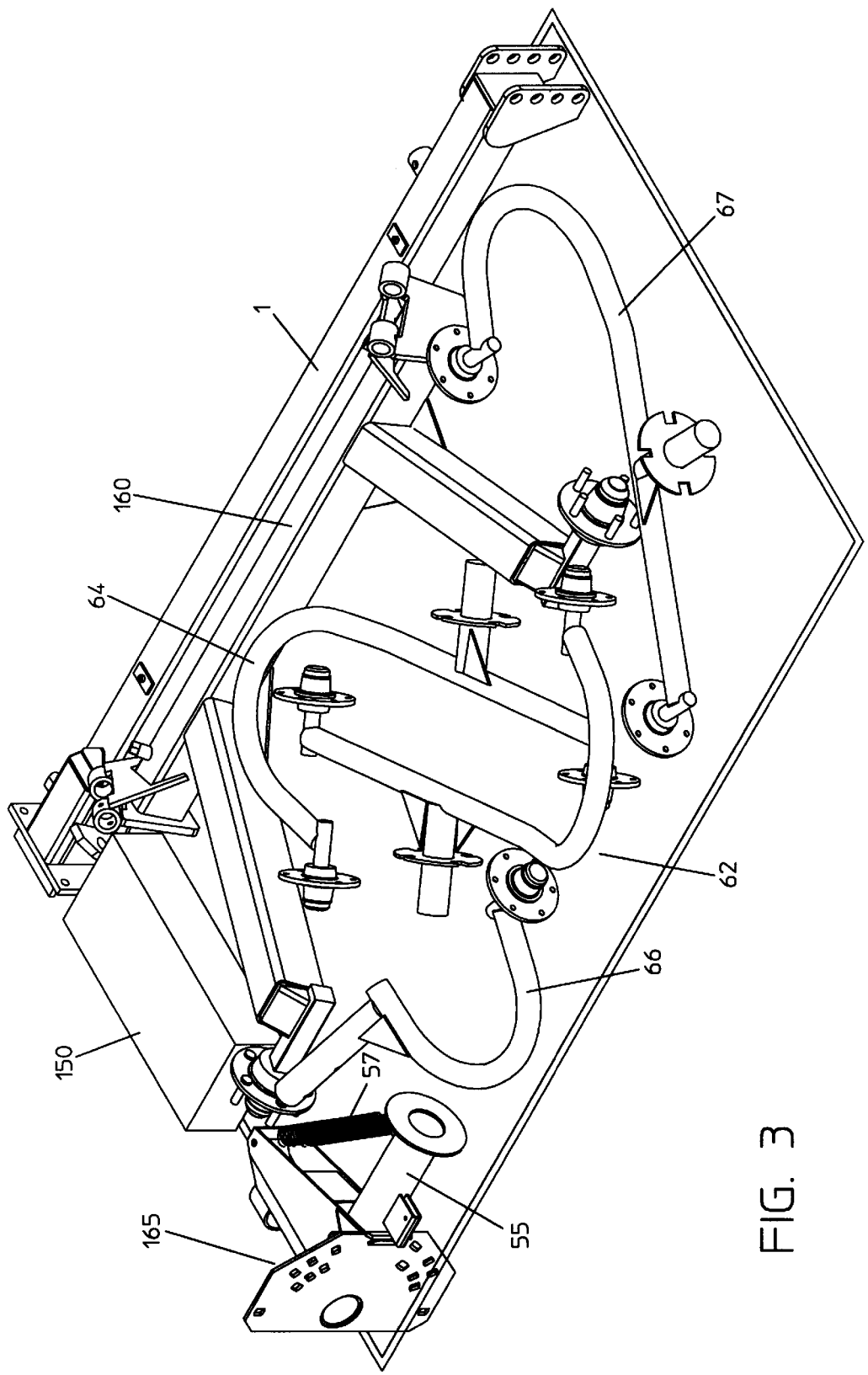
FIG. 3 is a perspective view of the arrangement of the component parts of the embodiment of the hay rake of the present invention as disposed in the middle portion of the crate shown in FIG. 1.

FIG. 3 shows a representative arrangement of component parts of the hay rake that are preferably placed in the middle portion of the crate 151. They include, for example, tow bar 1(which determines the length of the crate), central frame element 160, connecting element 165, rake arm sections 62, 64, 66, and 67, and box 150. The middle portion also includes box 150. As discussed, box 150 is beneficial for holding miscellaneous small components of the hay rake, including, for example, nuts 183, 184, bolts 35, 36, and 37, pins 14, 15, 40, 76, and plates 6, 25, and 26. Placing such components in a box 150 helps reduce the chance of loss during shipment and storage.

Figure 4:
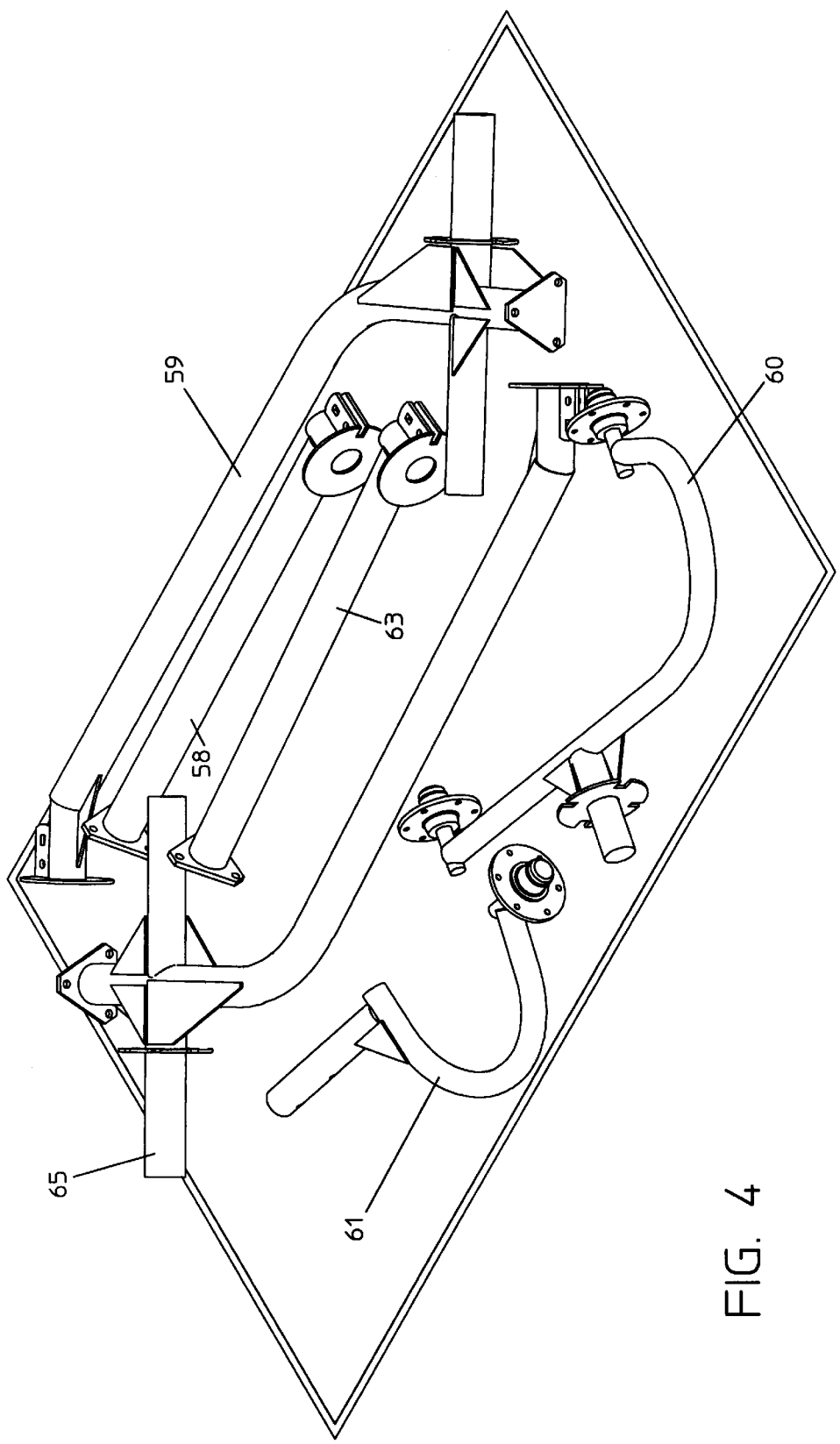
FIG. 4 is a perspective view of the arrangement of the component parts of the embodiment of the hay rake of the present invention as disposed in the top portion of the crate shown in FIG. 1.

FIG. 4 shows a representative arrangement of component parts of the hay rake that are preferably placed in the top layer. Those include various rake arm sections 58, 59, 63, 65, and remaining rake arm mounts 60 and 61.

While FIGS. 1–4 represent a possible arrangement for packaging the component parts of the hay rake into a crate 151, it will be appreciated by those of skill in the art that other arrangements of the component parts are possible and would be within the spirit and scope of the present invention.

Figure 42:
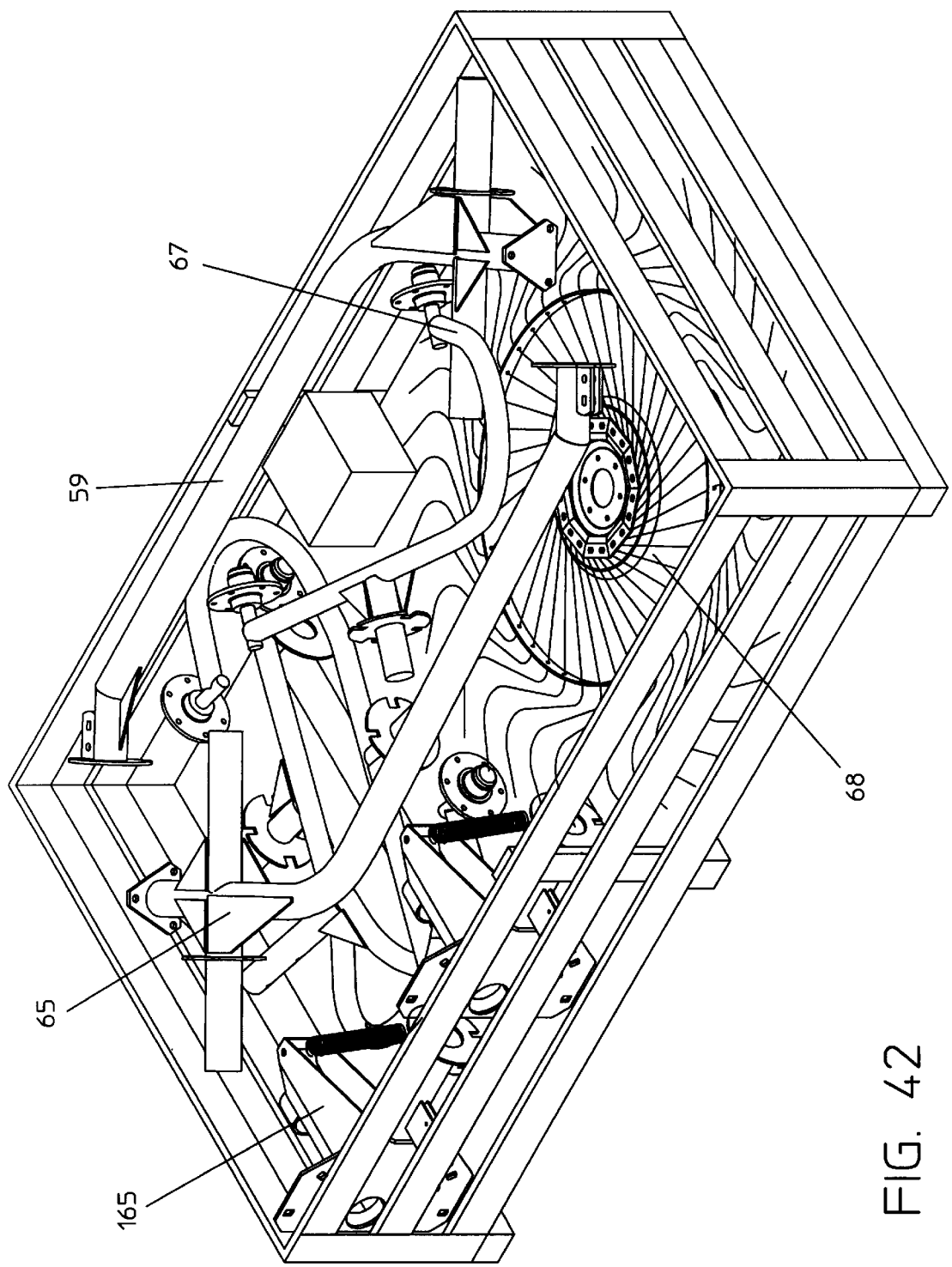
FIG. 42 is a perspective view showing one arrangement of the component parts of the rake arm portion of the hay rake of the present invention packaged in a single rectangular crate.
Figure 43:
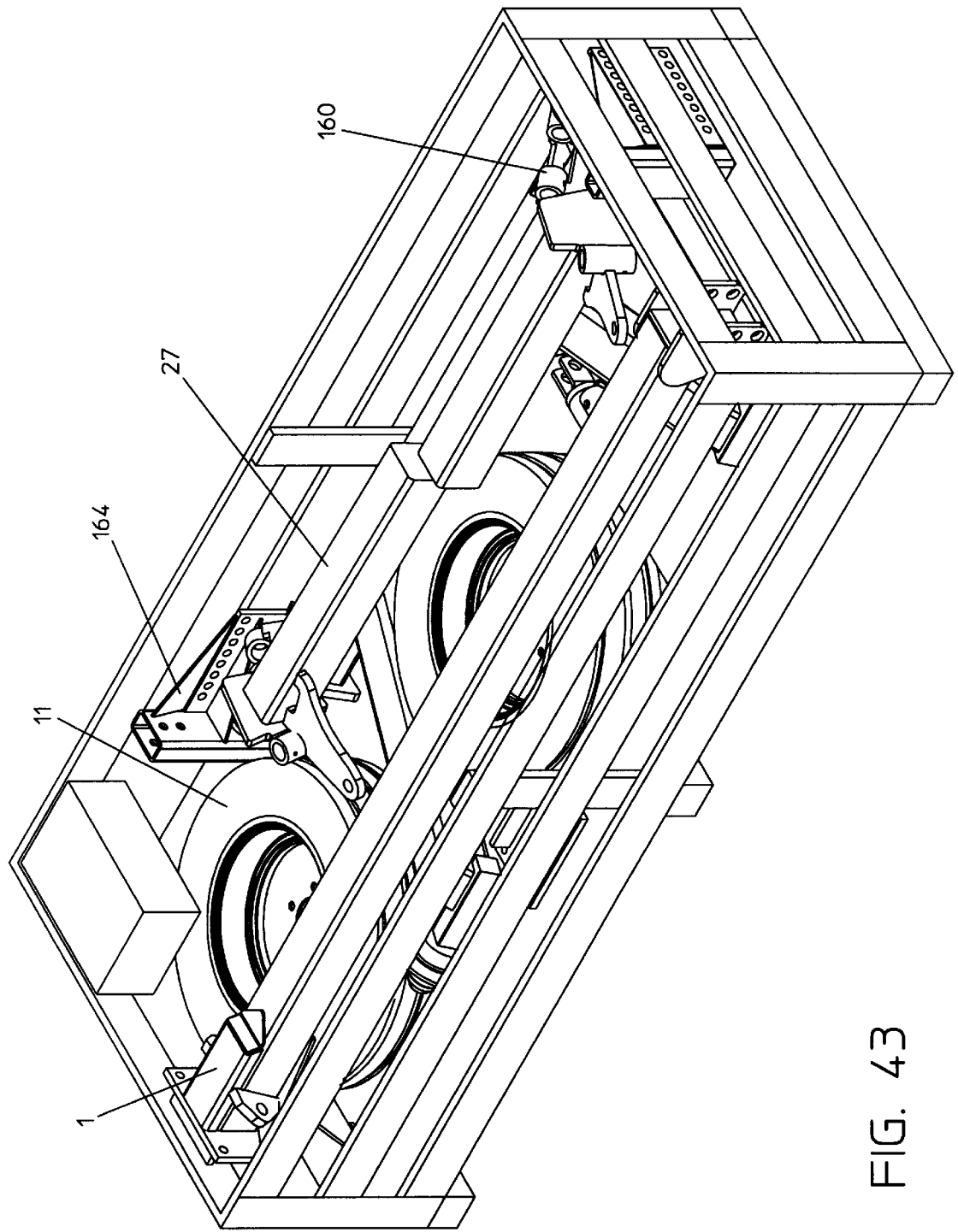
FIG. 43 is a perspective showing of one arrangement of one embodiment of the main frame of the hay rake of the present invention packaged as a hay rake caddy in a single rectangular crate.

One of ordinary skill in the art will also appreciate that the main frame portion of the hay rake 200 may be sold as a caddy, and may be shipped separately from the rake arms. In this case one could fashion a similar packaging arrangement wherein the length of the crate would be determined by the tow bar 1, as illustrated in FIG. 43. Thus the length of the crate would be a little greater than the tow bar 1, preferably not more than about 200 mm greater, and most preferably not more than about 100 mm greater. The dimensions of the crate are preferably about 1.8 to about 2.8 meters in length, about 0.7 to about 1.7 meters in width, and about 0.2 to 0.8 meters in height, more preferably 2 to 2.6 meters in length, 0.9 to 1.5 meters in width and 0.4 to 0.6 meters in height, and most preferably 2.3 meters in length, 1.2 meters in width and 0.54 meters in height. Likewise the rake arms 167, 168 may be sold and shipped separately from the main frame 200. In this case one could fashion a similar packaging arrangement wherein the width of the crate would be determined by the rake wheels, the length would be determined by the longest of the rake arm sections or rake arm mounts, and the height would be determined by the length of the base plate 50, 51 of connecting elements 165, 166, as illustrated in FIG. 42. Thus, the dimensions would be a little greater than the above-mentioned dimension determining parts, preferably not more than about 200 mm greater, and most preferably not more than about 100 mm greater. The dimensions of the crate are preferably about 1.7 to about 2.7 meters in length, about 1 to about 2 meters in width, and about 0.2 to 0.8 meters in height, more preferably 1.9 to 2.5 meters in length, 1.2 to 1.8 meters in width and 0.4 to 0.6 meters in height, and most preferably 2.2 meters in length, 1.5 meters in width and 0.45 meters in height.

Of course, assembly and disassembly of the caddy and rake arms would be the same as described for those portions in the description of the assembly and disassembly of the entire hay rake.

The above mentioned features, as illustrated, are exemplary in nature and are not to be construed as limitations of the present invention as set forth in the following claims. Persons skilled in the art will readily appreciate that variations from the description are possible without departing from the spirit and scope of the invention as defined in the claims. For example, variations with respect to the particulars of the geometry, the means of realization, the materials employed, the mechanical and hydraulic components known to persons skilled in the art, or the details of construction. For example, one could modify the point at which the double acting hydraulic cylinders attach, or one could vary the number of rake wheels per arm, or the number of sections into which each rake arm is subdivided, or the order and way in which the components are arranged in the crate.

What is claimed is:

1. A pull type hay rake, comprising:
   a tow bar having a front end and a back end;
   a central frame member detachably secured to the back end of the tow bar, the central frame member having a longitudinal axis and a right end and a left end at opposed ends of the longitudinal axis;
   right and left lateral elements detachably and pivotally connected to the right and left opposed ends of the central frame member, respectively, the right and left lateral elements extending from the central frame member's opposed ends along the longitudinal axis of the central frame member;
   right and left appendices adapted to receive right and left wheels for mounting thereon, the right and left appendices attached to the central frame member and disposed between the right and left lateral elements; and
   disassemblable right and left rake arm assemblies having a plurality of rake wheels detachably and rotatably secured thereto, said right and left rake arm assemblies detachably securable to the right and left lateral elements.

2. The hay rake according to claim 1, further comprising right and left actuation mechanisms disposed between the tow bar and the right and left lateral elements, respectively, for pivoting the lateral elements from an operating position to a transport position.

3. The hay rake according to claim 1, further comprising right and left actuation mechanisms disposed between the central frame member and the right and left lateral elements, respectively, for pivoting the lateral elements from an operating position to a transport position.

4. The hay rake according to claim 1, further comprising right and left actuation mechanisms disposed between the right and left appendices and the right and left lateral elements, respectively, for pivoting the lateral elements from an operating position to a transport position.

5. The hay rake according to claim 1, further comprising a hitch mechanism disposed at the front end of the tow bar.

6. The hay rake according to claim 1, further comprising right and left mounting studs detachably securable to the right and left lateral elements, respectively, and disposed for detachably securing the right and left rake arm assemblies thereto.

7. The hay rake according to claim 1, wherein the rake arm assemblies may be disassembled into rake arm components.

8. The hay rake according to claim 1, further comprising,
   a rear extension arm detachably securable to the central frame member; and
   a rear rake wheel detachably securable to the rear extension arm.

9. The hay rake according to claim 1 wherein each of the right and left rake arm assemblies comprises:

at least one rake arm section;

a connecting element adapted to connect the at least one rake arm section to the respective right and left lateral elements; and at least one rake wheel mount detachably secured to the at least one rake arm section;

wherein the plurality of rake wheels are detachably and rotatably mounted to the at least one rake wheel mount.

10. The hay rake according to claim 9, wherein each of the right and left rake arm assemblies comprises:

at least two rake wheel mounts wherein each rake arm assembly can hold a total of four rake wheels.

11. The hay rake according to claim 9, wherein each of the right and left rake arm assemblies comprises:

a first and second rake arm section; and a first, second and third rake wheel mount, wherein each rake arm assembly can hold a total of five rake wheels and two of the rake wheel mounts are adapted to hold two rake wheels and one rake wheel mount is adapted to hold one rake wheel.

12. The hay rake according to claim 2, wherein the right and left actuation mechanisms comprise right and left hydraulic cylinders, respectively.

13. The hay rake according to claim 12, further comprising hydraulic lines coupled to the hydraulic cylinders, the hydraulic lines adapted to communicate with a source of hydraulic fluid and to provide hydraulic fluid to the hydraulic cylinders.

14. The hay rake according to claim 13, further comprising a mechanical shut-off valve disposed between the hydraulic line and at least one of the right and left hydraulic cylinders.

15. The hay rake according to claim 13 further comprising:

an electro-mechanical valve disposed between the hydraulic lines and at least one of the right and left hydraulic cylinders; and an electrical wire disposed in electrical communication with the electro-mechanical valve.

16. The hay rake according to claim 13 wherein the right and left rake arm assemblies are rotatably secured to the right and left lateral elements, respectively, to provide for rotational adjustability in the horizontal plane of the right and left rake arm assemblies relative to the right and left lateral elements.

17. The hay rake according to claim 16, further comprising right and left actuating elements disposed respectively between the right lateral element and the right rake arm assembly and the left lateral element and the left rake arm assembly.

18. The hay rake according to claim 1 which is disassembled into its component parts and packaged into a shipping container, wherein the shipping container has a length determined by the tow bar and a width determined by the diameter of the rake wheels.

19. The hay rake according to claim 18 wherein the length of the shipping container is not more than about 200 mm greater than the length of the tow bar, and the width of the shipping container is not more than 200 mm greater than the diameter of the rake wheels.

20. The hay rake according to claim 18 wherein the length of the shipping container is not more than about 100 mm greater than the length of the tow bar, and the width of the shipping container is not more than 100 mm greater than the diameter of the rake wheels.

21. The hay rake according to claim 1 wherein the right and left lateral elements are formed similar in cross-section to the central frame member.

22. The hay rake of claim 1 wherein the right and left lateral elements are detachably and pivotally connected to the right and left opposed ends of the central frame member by a double axis hinge comprising two hinge receptacles adapted for receiving hinge pins, said hinge receptacles being at an angle to each other.

23. The hay rake of claim 22 wherein the hinge receptacles of the double axis hinge are perpendicular to each other.

24. A pull type hay rake caddy, comprising:

a tow bar having a front end and a back end;

a central frame member detachably secured to the back end of the tow bar, the central frame member having a longitudinal axis and a right end and a left end at opposed ends of the longitudinal axis;

right and left lateral elements detachably and pivotally connected to the right and left opposed ends of the central frame member, respectively, the right and left lateral elements extending from the central frame member's opposed ends along the longitudinal axis of the central frame member;

right and left appendices adapted to receive right and left wheels for mounting thereon, the right and left appendices attached to the central frame member and disposed between the right and left lateral elements; and right and left mounting studs detachably securable to the right and left lateral elements.

25. The hay rake caddy of claim 24 wherein the tow bar, central frame member, right and left lateral elements, right and left appendices, and right and left mounting studs are packaged into a single shipping container having a length determined by a length of the tow bar.

26. The hay rake caddy according to claim 24 wherein the right and left lateral elements are formed similar in cross-section to the central frame member.

27. The hay rake of claim 26 wherein the right and left lateral elements are detachably and pivotally connected to the right and left opposed ends of the central frame member by a double axis hinge comprising two hinge receptacles adapted for receiving hinge pins, said hinge receptacles being at an angle to each other.

28. The hay rake of claim 27 wherein the hinge receptacles of the double axis hinge are perpendicular to each other.

* * * * *